(12) United States Patent
Lin et al.

(10) Patent No.: US 9,007,927 B2
(45) Date of Patent: Apr. 14, 2015

(54) HANDING OFF AN ACCESS TERMINAL DURING A MULTICAST SESSION WITHIN A WIRELESS COMMUNICATIONS SYSTEM

(75) Inventors: Yih-Hao Lin, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 12/751,675

(22) Filed: Mar. 31, 2010

(65) Prior Publication Data

US 2010/0260089 A1    Oct. 14, 2010

Related U.S. Application Data

(60) Provisional application No. 61/168,855, filed on Apr. 13, 2009.

(51) Int. Cl.
*H04L 12/26* (2006.01)
*H04W 4/00* (2009.01)
*H04W 36/38* (2009.01)

(52) U.S. Cl.
CPC ................... *H04W 36/385* (2013.01)

(58) Field of Classification Search
None
See application file for complete search history.

(56) References Cited

U.S. PATENT DOCUMENTS

| | | | | |
|---|---|---|---|---|
| 2004/0198371 | A1* | 10/2004 | Balasubramanian et al. | 455/450 |
| 2004/0203816 | A1* | 10/2004 | Bae et al. | 455/450 |
| 2005/0073990 | A1* | 4/2005 | Chang et al. | 370/349 |
| 2005/0078676 | A1* | 4/2005 | Bae et al. | 370/390 |
| 2006/0063531 | A1* | 3/2006 | Jung et al. | 455/442 |
| 2007/0140173 | A1* | 6/2007 | Tomizu | 370/331 |
| 2009/0080363 | A1* | 3/2009 | Song et al. | 370/312 |
| 2009/0082025 | A1 | 3/2009 | Song | |

FOREIGN PATENT DOCUMENTS

| | | |
|---|---|---|
| CN | 1874573 A | 12/2006 |
| KR | 20060026374 A | 3/2006 |

OTHER PUBLICATIONS

International Preliminary Report on Patentability—PCT/US2010/030811, The International Bureau of WIPO—Geneva, Switzerland, Jul. 26, 2011.
International Search Report and Written Opinion—PCT/US2010/030811, International Search Authority—European Patent Office—Aug. 20, 2010.

(Continued)

*Primary Examiner* — Steven H Nguyen
(74) *Attorney, Agent, or Firm* — Michael F. Taveira

(57) ABSTRACT

Methods and apparatuses for multicasting within a wireless communications system are disclosed. In one embodiment a method of multicasting within a wireless communications system operating in accordance with a given wireless communication protocol includes monitoring multicast messages associated with a given multicast session in a first sector. A handoff occurs from the first sector to a second sector. It is determined whether the second sector is transmitting multicast messages associated with the given multicast session. Then, based on the determination, a registration request for the given multicast session within the second sector is transmitted on a reverse link access channel in an earlier slot than a next designated slot for registration requests as defined by the wireless communication protocol.

60 Claims, 15 Drawing Sheets

(56) References Cited

OTHER PUBLICATIONS

Jung J, Bae B S, Beyongsu K, Daegyun K, Marks RJ: Autonomous Soft Handoff Enhancement for BCMCS 3GPP2-Drafts, 2500 Wilson Boulevard, Suite 300, Arlington, Virginia 22201 USA, 3GPP2 TSG-C SWG2.5, Aug. 18, 2003, pp. 1-4, XP040345880.

Jung J, Bae B S: "Technical Document Discrepancy Report: C.S0054!CDMA2000 High Rate Broadcast-Multicast Packet Data Air Specificaiton" 3GPP2-Drafts, 2500 Wilson Boulevard, Suite 300, Arlington, Virginia 22201 USA, Sep. 24, 2003, pp. 1-7, XP040345490.

* cited by examiner

HANDING OFF AN ACCESS TERMINAL DURING A MULTICAST SESSION WITHIN A WIRELESS COMMUNICATIONS SYSTEM

CLAIM OF PRIORITY UNDER 35 U.S.C. §119

The present application for patent claims priority to Provisional Application No. 61/168,855 entitled "HANDING OFF AN ACCESS TERMINAL DURING A MULTICAST SESSION WITHIN A WIRELESS COMMUNICATIONS SYSTEM" filed Apr. 13, 2009, and assigned to the assignee hereof and hereby expressly incorporated by reference herein.

BACKGROUND OF THE INVENTION

1. Field of the Invention

Embodiments of the present invention are directed to multicasting within a wireless communications system, and more particularly to handing off an access terminal during a multicast session within the wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the invention are directed to methods and apparatuses for multicasting within a wireless communications system, and more particularly to handing off an access terminal during a multicast session within the wireless communications system. In one embodiment a method of multicasting within a wireless communications system operating in accordance with a given wireless communication protocol includes monitoring multicast messages associated with a given multicast session in a first sector. A handoff occurs from the first sector to a second sector. It is determined whether the second sector is transmitting multicast messages associated with the given multicast session. Then, based on the determination, a registration request for the given multicast session within the second sector is transmitted on a reverse link access channel in an earlier slot than a next designated slot for registration requests as defined by the wireless communication protocol.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
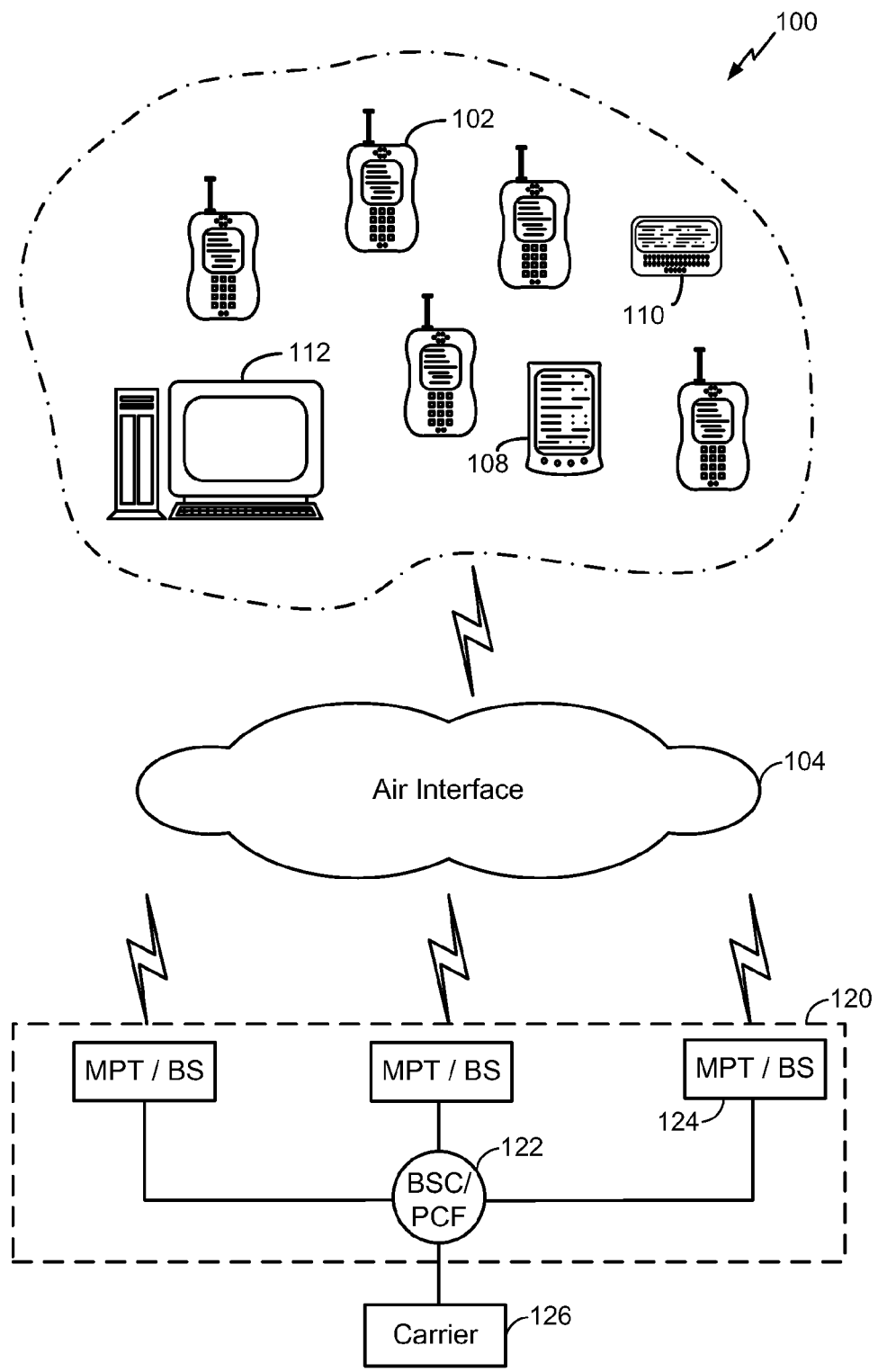
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
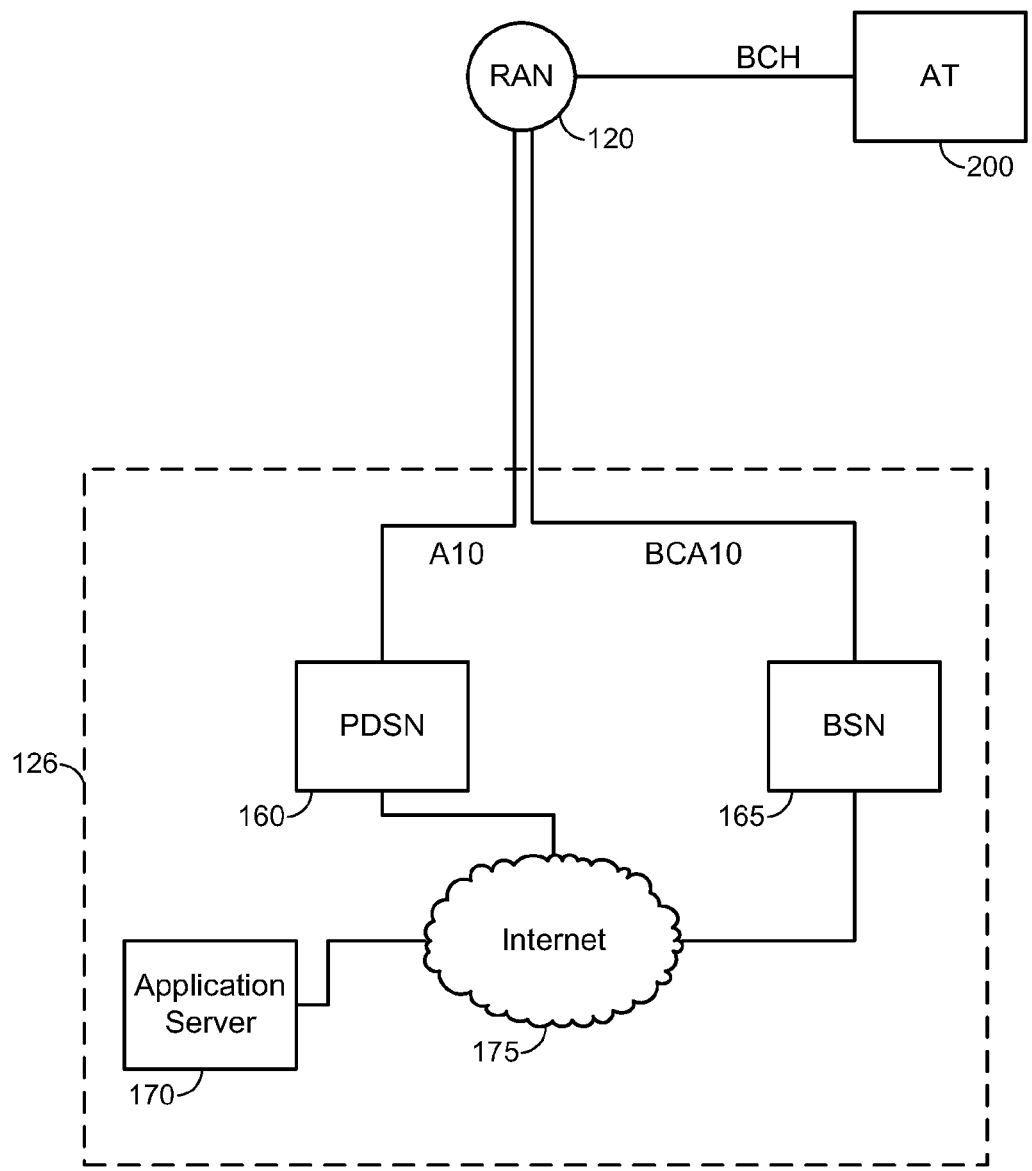
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
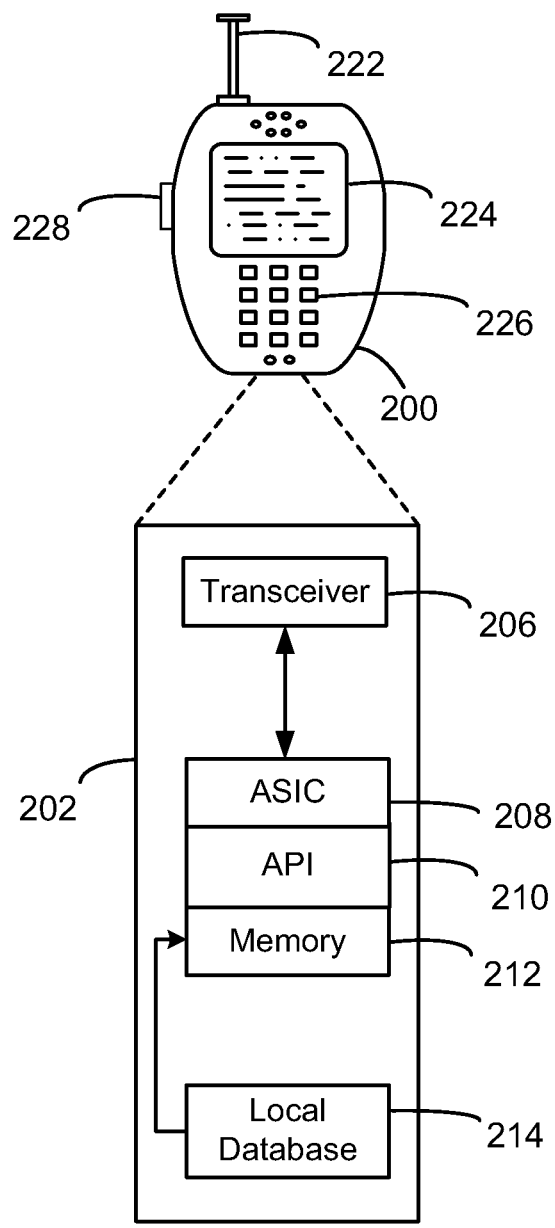
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Below, a description of multicast call-setup for multicast sessions that are carried on a downlink broadcast channel (BCH) in both target and supporting sectors will be described, followed by a description of multicast call-setup for multicast sessions that are carried in one or more target sectors (e.g., but not necessarily in supporting sectors). As used herein, a target sector is any sector within a wireless communications system having (or expected to have) at least one multicast group member that carries a multicast flow for a given multicast session, and a supporting sector is any sector within the wireless communications system that is not expected to have multicast group members and also carries the multicast flow (e.g., to enable soft combining in target sectors for high-data rate multicast communications). Target and supporting sector behavior is discussed in more detail within Non-Provisional U.S. Provisional Patent Application No. 60/974,800, entitled "MULTICAST COMMUNICATIONS WITHIN A WIRELESS COMMUNICATIONS NETWORK", by Song et al., filed on Sep. 24, 2007, assigned to the assignee hereof and expressly incorporated by reference herein in its entirety.

Figure 4A:
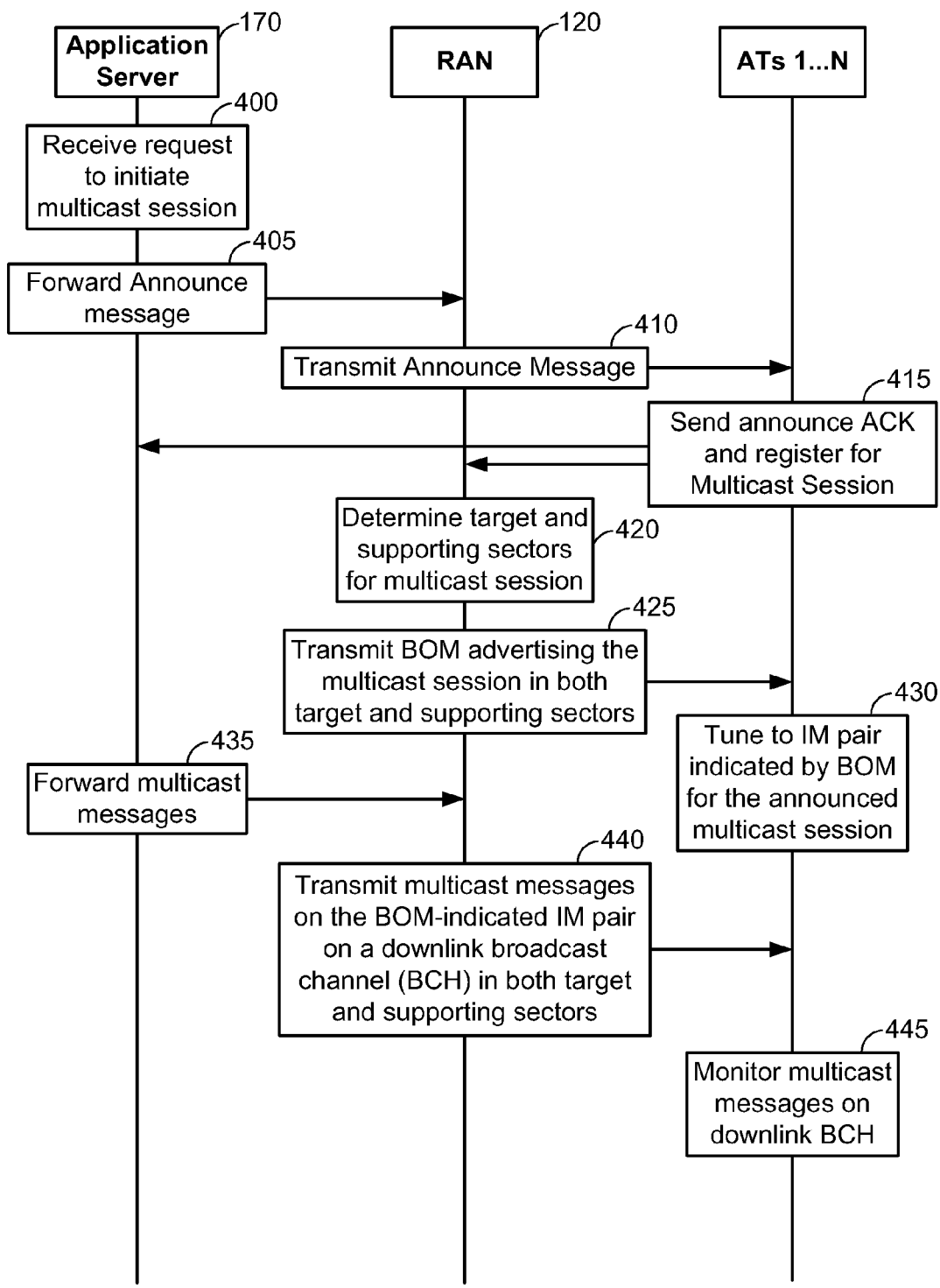
FIG. 4A illustrates a multicast call-setup process for a multicast session to be carried on a downlink broadcast channel (BCH) in both target and supporting sectors according to an embodiment of the present invention.

Accordingly, FIG. 4A illustrates a multicast call-setup process for a multicast session to be carried on a downlink BCH in both target and supporting sectors according to an embodiment of the present invention. Referring to FIG. 4A, in 400, the application server 170 (e.g., a QChat or Push-to-Talk (PTT) server) receives a request to initiate a multicast session (e.g., from a PTT initiator, not shown). In 405, the application server 170 forwards an announce message to the RAN 120 for transmission to access terminals ("multicast group members", e.g., ATs 1 ... N) that belong to a multicast group of the multicast session. For example, the application server 170 can forward the announce message to the RAN 120 through the BSN 165 via a BCA10 connection. In 410, the RAN 120 receives the announce message over the BCA10 connection and transmits the announce message to ATs 1 ... N over the air interface 104 (e.g., as a data-over-signaling (DOS) message on the downlink CCH, via a standard paging of ATs 1 ... N, etc.). ATs 1 ... N receive the announce message and one or more of ATs 1 ... N register for the multicast session, 415 (e.g., by transmitting a BCMCSFlowRegistration message) and send an announce acknowledgment (ACK) that the RAN 120 forwards to the application server 170.

Figure 4B:
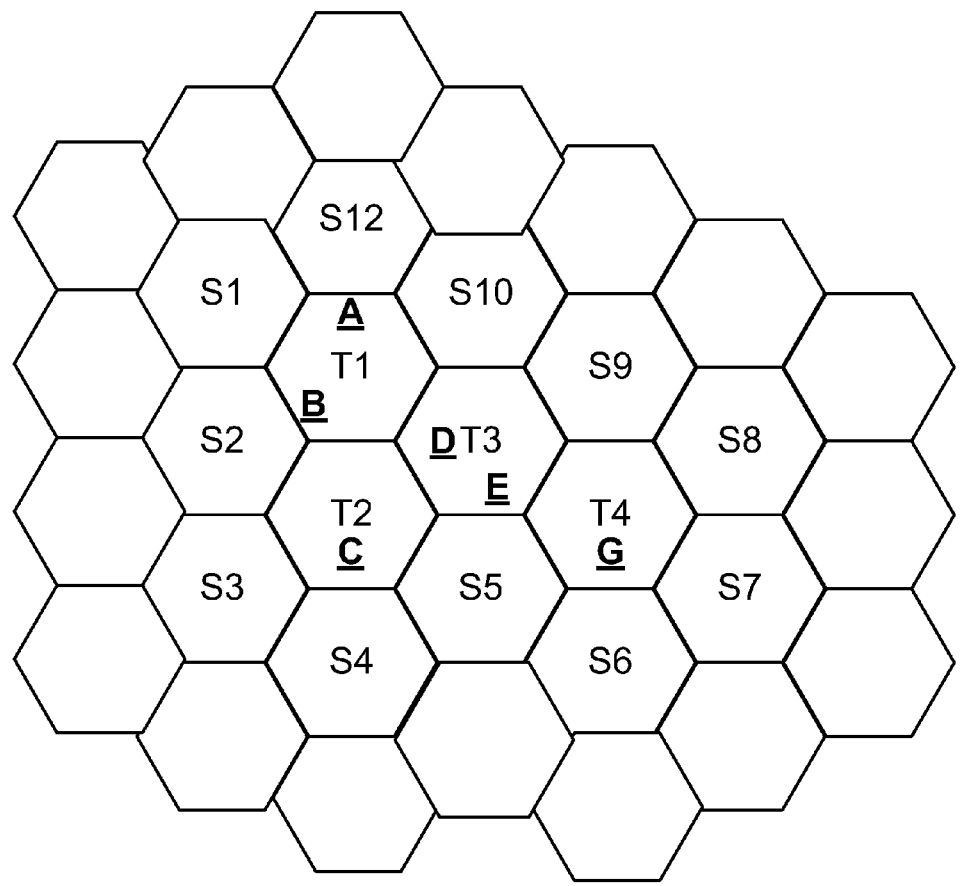
FIG. 4B illustrates a cluster formed during the process of FIG. 4A.

Based at least in part on the registrations received from ATs 1 ... N, the RAN 120 determines the initial target and supporting sectors for the multicast session, 420. FIG. 4B illustrates an example cluster (i.e., a set of target and supporting sectors that carry a flow for the multicast session, referred to as a 'multicast flow', on the same interlace-multiplex (IM) pair of a downlink broadcast channel (BCH)) that may be formed in 420 of FIG. 4A. As shown, FIG. 4B assumes that ATs A ... G have registered for the multicast session, that ATs A ... G reside in target sectors T1 through T4, respectively, and that target sectors T1 through T4 are supported by supporting sectors S1 through S12. Cluster origination is described in greater detail within the above-incorporated co-pending patent entitled "METHODS OF PROVIDING MULTICAST COMMUNICATIONS WITHIN A WIRELESS COMMUNICATIONS NETWORK". While one cluster is illustrated in FIG. 4B, it will be appreciated that multiple clusters can be formed in the wireless communication system, with each cluster carrying the multicast flow on the same IM pair of the downlink BCH, or alternatively upon two or more different IM pairs based on BCH scheduling considerations at the RAN 120.

The RAN 120 transmits a scheduling message (e.g., a broadcast overhead message (BOM)) in the target and supporting sectors, 425. For example, the BOM can include an advertisement of the announced multicast session, along with information instructing ATs 1 ... N on how to tune to the multicast session on the downlink BCH (e.g., an interlace-multiplex (IM) pair on the downlink BCH upon which multicast messages for the multicast session are to be transmitted). As will be appreciated by one of ordinary skill in the art, the RAN 120 attempts to configure each sector of the cluster to carry the multicast session on the same IM pair to enhance soft combining (e.g., as used herein, if sectors carry the multicast flow or session on different IM pairs, the sectors will be construed as being part of different clusters, and a sector transmitting on multiple IM pairs will be construed as belonging to multiple clusters). In a further example, BOMs transmitted in target sectors are configured to suppress subsequent AT registrations (e.g., RFDB='0' to reduce traffic, except for when the RAN 120 wants to confirm the status of the target sectors,), and BOMs transmitted in supporting sectors are configured to prompt AT registrations (e.g., so that the RAN 120 can transition the supporting sector to a target sector, e.g., RFDB='1'). Accordingly, the ATs 1 ... N that have received the BOM tune to the indicated IM pair and monitor for the multicast messages, 430.

In 435, after the application server 170 receives a first announce ACK for the multicast session, the application server 170 begins forwarding multicast messages (e.g., multicast media messages, such as video, audio, text, etc.) to the RAN 120 via the BSN 165 over the BCA10 connection for transmission to ATs 1 ... N. In 440, the RAN 120 receives the multicast messages over the BCA10 connection and transmits the multicast messages to ATs 1 ... N over the air interface 104 on the BOM-indicated IM pair of the downlink BCH, in both the target and supporting sectors. The ATs 1 ... N that have tuned to the BOM-indicated IM pair of the downlink BCH receive and decode the multicast messages, 445.

As will be appreciated by one of ordinary skill in the art, transmitting multicast messages in supporting sectors to be used for soft combining for access terminals within the target sectors helps the access terminals decode high-data rate broadcasts or multicasts. However, if the multicast has a relatively low-data rate (e.g., a push-to-talk (PTT) call, a VoIP call, etc.), the access terminals may not necessarily need to soft combine with the supporting sector transmission(s) to decode the multicast messages successfully. Also, if multicast group members are not geographically densely located (e.g., there are not a high number of multicast group members in any particular target sector), then the potentially large number of supporting sectors may decrease an overall spectral efficiency because many sectors are transmitting redundant information to reach only a few local multicast group members.

Figure 5A:
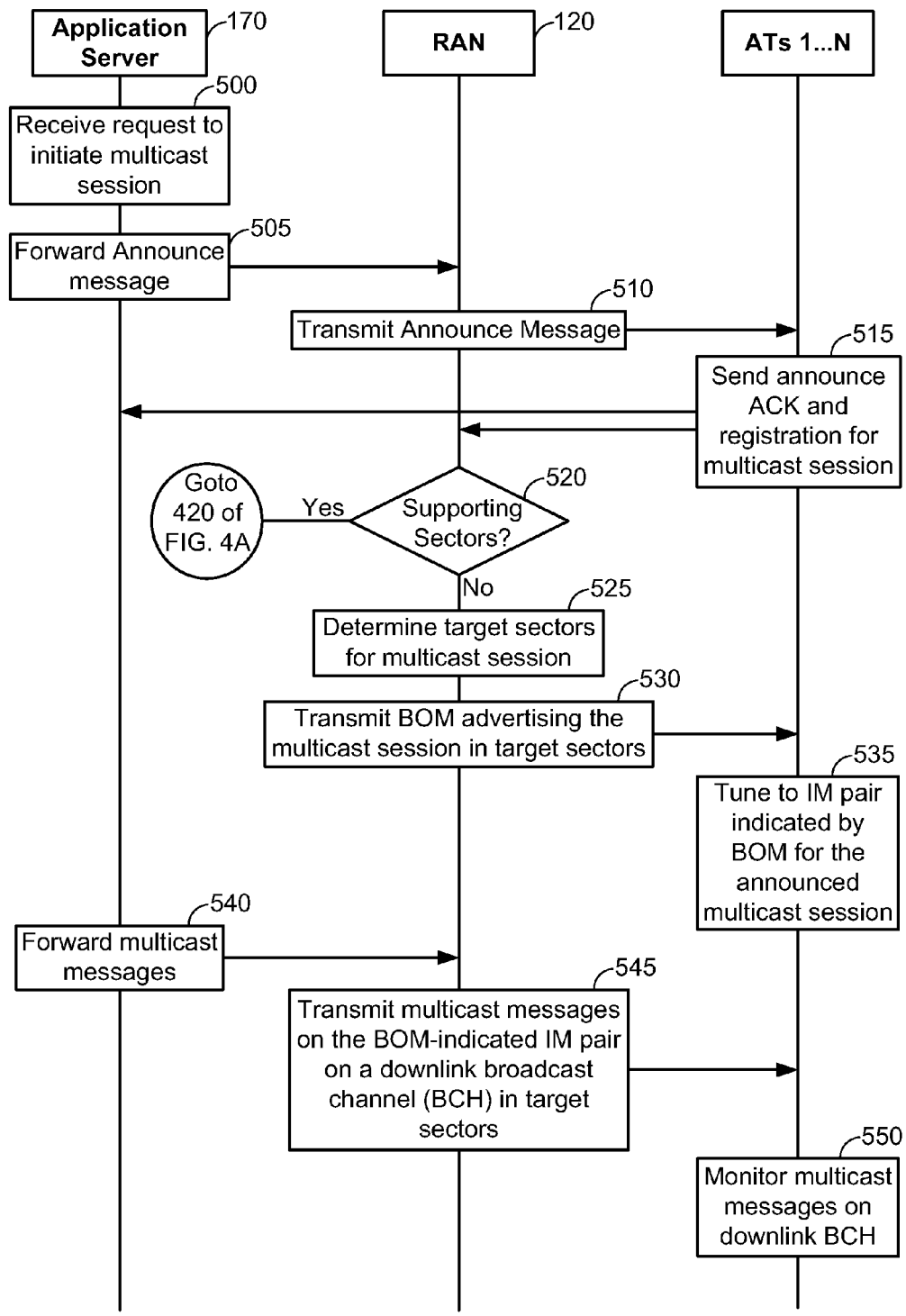
FIG. 5A illustrates a multicast call-setup process for a multicast session to be carried on the downlink BCH in one or more target sectors according to an embodiment of the present invention.

Accordingly, embodiments of the present invention wherein supporting sectors need not be used will now be described in greater detail with respect to FIGS. 5A-8. FIG. 5A illustrates a multicast call-setup process for a multicast session to be carried on the downlink BCH in one or more target sectors according to an embodiment of the present invention. 500 through 515 of FIG. 5A correspond to 400 through 415 of FIG. 4A, and as such a further description thereof has been omitted for the sake of brevity. In 520, the RAN 120 determines whether to form a cluster upon which to carry the multicast session that includes both supporting sectors and target sectors, as in FIG. 4A, or whether to form the cluster to include only target clusters. For example, if the RAN 120 determines the multicast session to be a relatively low data-rate communication, the RAN 120 may determine soft combining to be unnecessary and as such can omit the supporting sectors. If the RAN 120 determines in 520 to include both target and supporting sectors, the process advances to 420 of FIG. 4A. Otherwise, if the RAN 120 determines in 520 to include only target sectors, the process advances to 525 of FIG. 5A.

Figure 5B:
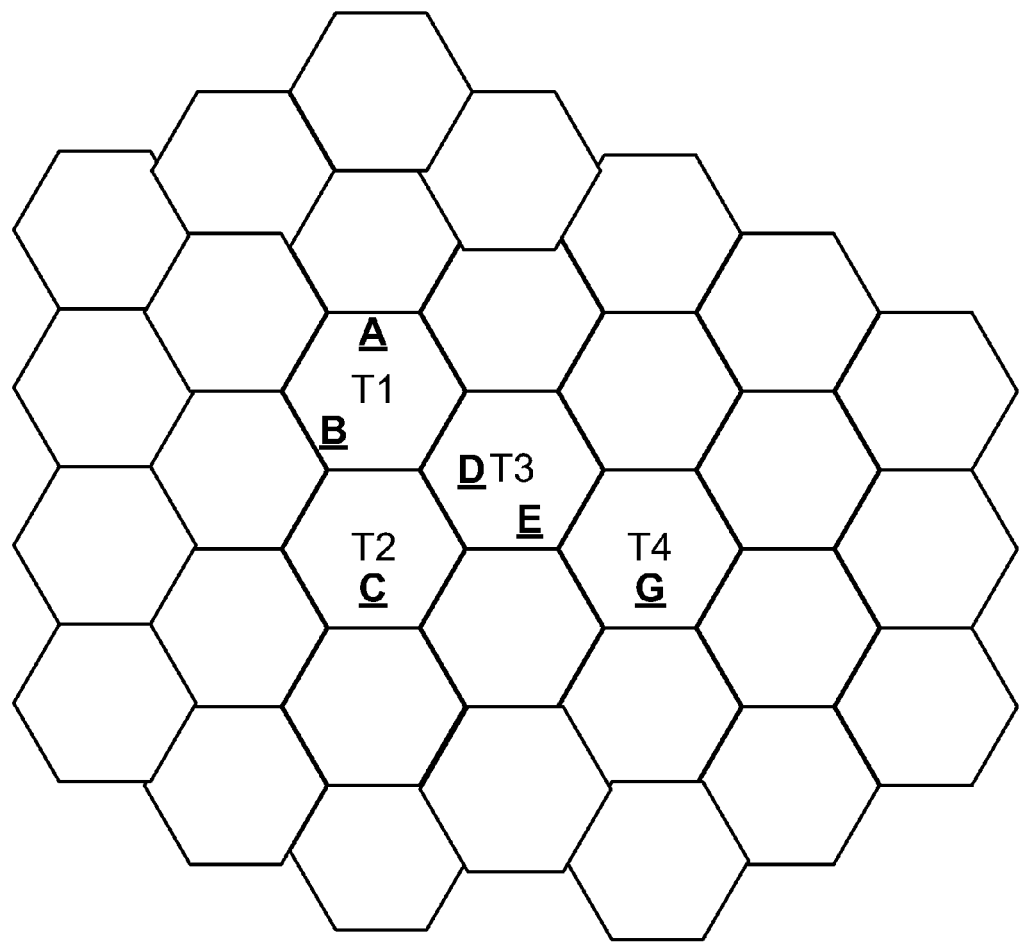
FIG. 5B illustrates an example of a cluster of sectors that may be generated to support the multicast session during the process of FIG. 5A according to an embodiment.

Referring to FIG. 5A, in 525, based at least in part on the registrations received from ATs 1 ... N (in 515), the RAN 120 determines a cluster including target sectors, and no supporting sectors, for the multicast session. FIG. 5B illustrates an example cluster (i.e., a set of target sectors, in this case) that may be formed in 525 of FIG. 5A. As shown, FIG. 5B assumes that ATs A ... G have registered for the multicast session, that ATs A ... G reside in target sectors T1 through T4, respectively, and that target sectors T1 through T4 do not include supporting sectors (e.g., as compared with FIG. 4B, which includes supporting sectors S1 through S12). In an example, the determination of 520 may affect a localized set of target sectors, such that other clusters in other areas of the wireless communications system 100 can include supporting sectors and the no-supporting sector determination affects only a limited set of target sectors. Alternatively, the determination of 520 may be global, such that supporting sectors need not be used throughout the wireless communications system 100. Accordingly, the RAN 120 transmits a BOM within the target sectors that lists or advertises a flow identifier (ID) (e.g., a BCMCSFlowID) of the announced multicast session and an IM pair on the BCH that carries the multicast flow, 530, and ATs 1 ... N (e.g., ATs 1 ... G in FIG. 5B) tune to the BOM-indicated IM pair on the downlink BCH, 535, after decoding the BOM. After receiving a first announce ACK, the application server 170 begins to forward multicast messages to the RAN 120, 540, and the RAN 120 receives the multicast messages over the BCA10 connection and transmits the multicast messages to ATs 1 ... N over the air interface 104 on the BOM-indicated IM pair of the downlink BCH, in the targets sectors, 545. The ATs 1 ... N that have tuned to the BOM-indicated IM pair of the downlink BCH receive and decode the multicast messages, 550.

As will be appreciated, while the RAN 120 is illustrated in FIG. 5A as determining to form the cluster with or without supporting sectors in 520 of FIG. 5A, this determination may alternatively take place at the application server 170 in other embodiments of the invention, and may then be indicated to the RAN 120 via a flag (e.g., a DSCP value in a header portion of one or more multicast packets) or by some other indicia.

As described above, FIG. 5A illustrates how to establish a multicast flow to be carried on target sectors instead of both target and supporting sectors, such that spectral efficiency savings associated with this approach are achieved because fewer sectors transmit the same multicast messages redundantly. Also, as will be appreciated by one of ordinary skill in the art, omitting supporting sectors reduces the complexity of mobility management, because transitions to or from supporting-sector states need not be computed when a new multicast group member joins a multicast session, departs a multicast session, enters or exits a given sector, etc. However, because the supporting sectors are not included for transmitting the multicast flow on the same IM pair in sectors at least adjacent to the target sectors, the probability that an access terminal moving or handing off from a target sector into a non-target sector will miss multicast packets is increased, because a given delay period is incurred before the access terminal requests registration in the non-target sector to prompt the RAN 120 to carry the multicast flow in the new sector.

In conventional multicasting protocols, such as 1x EV-DO, registration messages (e.g., BCMCSFlowRegistration Messages) transmitted from access terminals are defined to be sent on a fixed, periodic slot of the reverse link access channel. Accordingly, upon entering a non-target sector during an active multicast session, the given delay period starts at an entry time into the non-target sector (e.g., a time of handoff, power-up and/or or a time at which multicast messages transmitted within the old target sector can no longer be decoded), plus a waiting time for determining the multicast flow is not being carried (e.g., based on an expiration of a broadcast overhead period without receiving a BOM, based on receiving a BOM that fails to indicate that the new sector is carrying the multicast flow, etc.) plus another waiting time until a next, fixed periodic slot on the reverse link access channel upon which registrations are scheduled for transmission, after which the access terminal can tune to the downlink BCH and decode the multicast flow. Embodiments of the invention, which will now be described in greater detail, are directed to more quickly triggering a registration transmission at access terminals within the wireless communications system upon entry into a non-target sector.

Figure 6A:
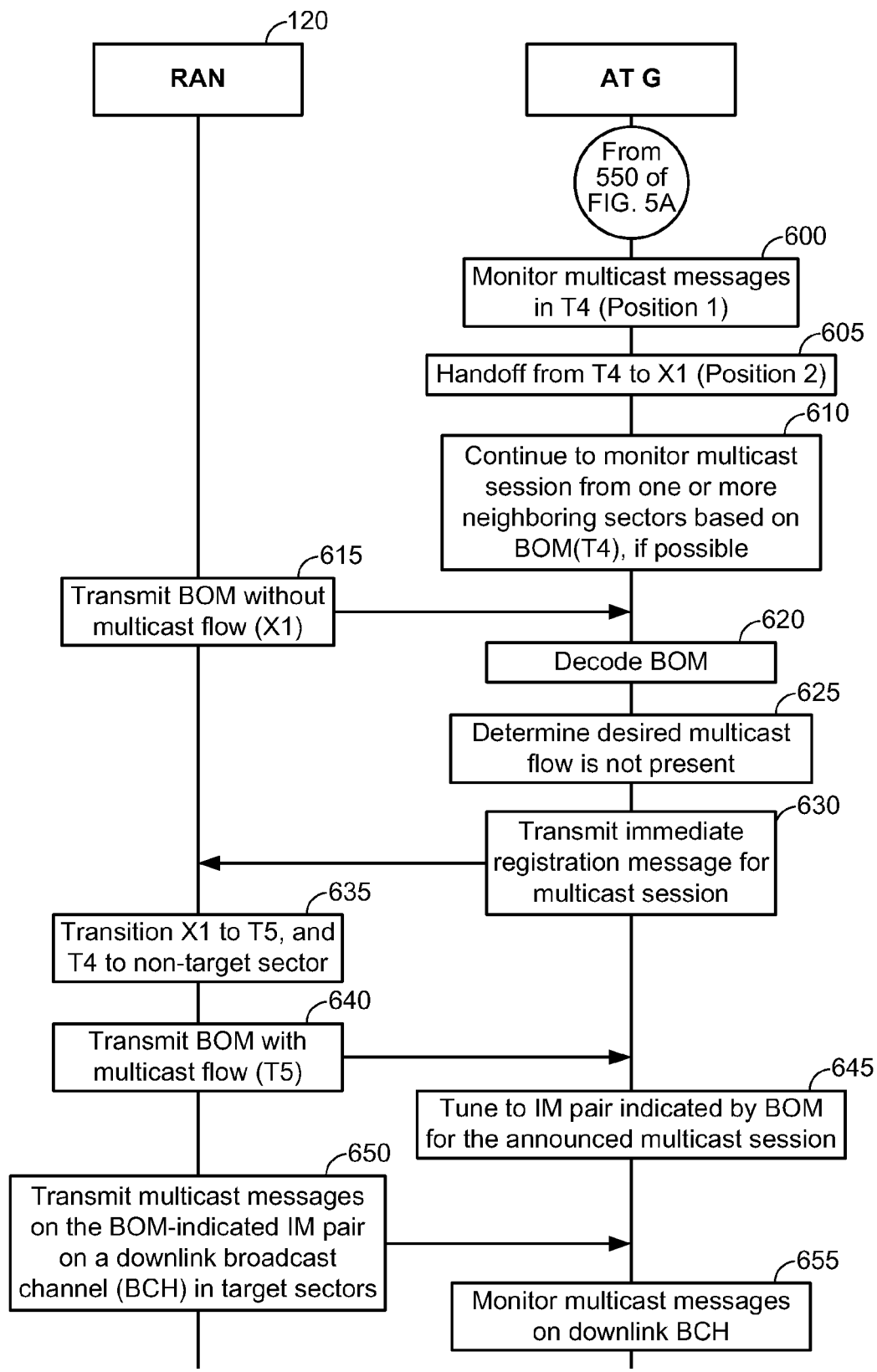
FIG. 6A illustrates BCH setup in a non-target sector for an active multicast session after the process of FIG. 5A according to an embodiment.
Figure 6B:
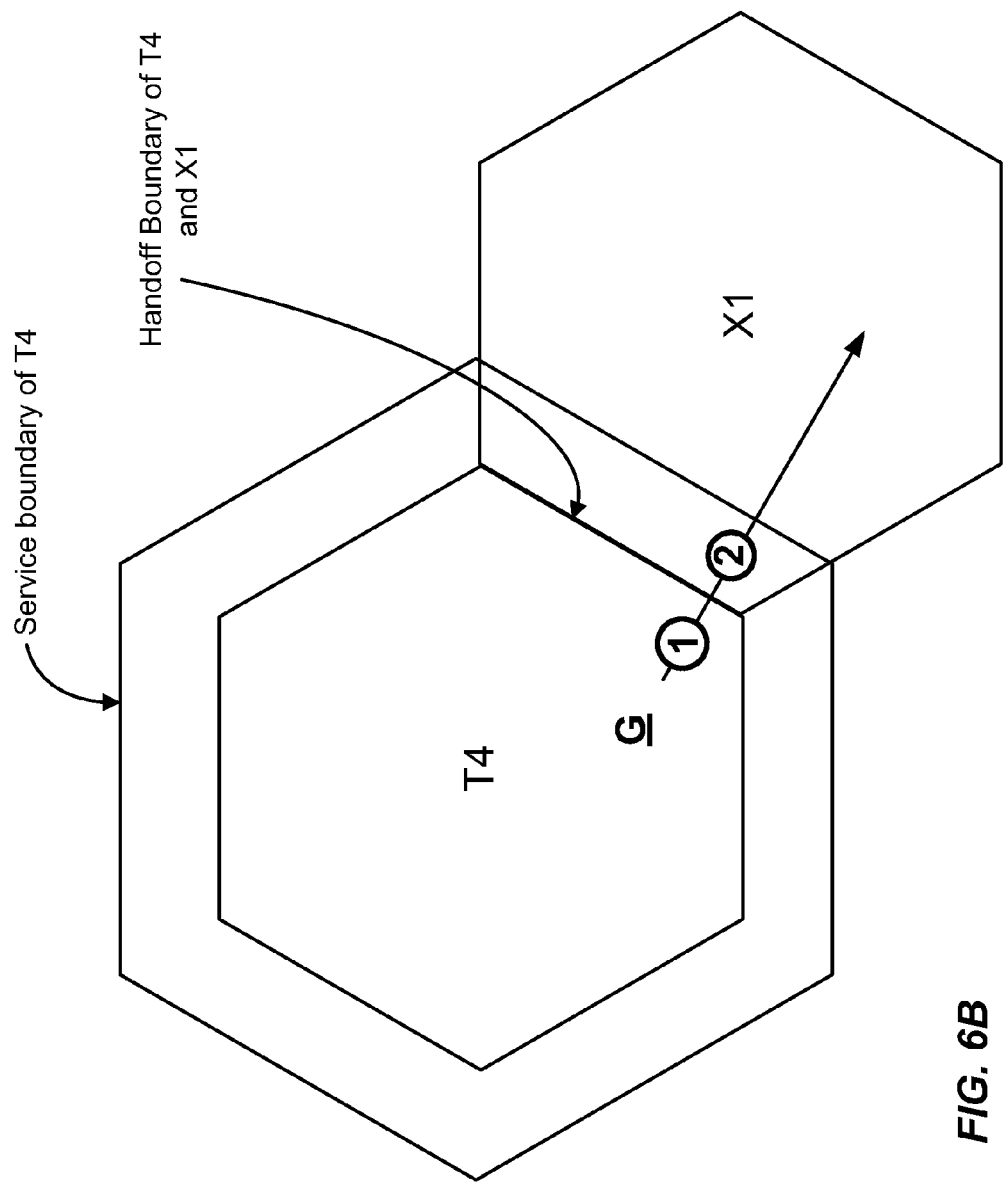
FIG. 6B illustrates a portion of the example cluster from FIG. 5B during the process of FIG. 6A according to an embodiment.

In an example, assume that the process of FIG. 5A is executed and that the cluster of FIG. 5B is actively carrying the multicast flow on a given IM pair. In FIG. 5B, T1 to T4 correspond to a group of sectors (e.g., referred to as a "cluster" or "multicast cluster") that carry the multicast flow on the same IM pair, while it is also possible that other clusters (not shown) carry the multicast flow on a different IM pair. With these assumptions, after 550 of FIG. 5A, the process advances to 600 of FIG. 6A. FIG. 6A illustrates BCH setup in a non-target sector X1 for an active multicast session according to an embodiment of the present invention. Referring to FIG. 6A, in 600, assume AT G is located at Position 1 within target sector T4, as illustrated in FIG. 6B. Next, in 605, AT G moves towards a neighboring sector X1, which is a non-target sector, and crosses a handoff boundary between T4 and X1, and is at Position 2 of FIG. 6B. Accordingly, AT G hands off from T4 to X1. In the handoff zone, AT G receives transmissions from one or more base stations in one or more sectors carrying the multicast session. For example, if the BOM transmitted in T4 before the handoff indicates that T4 and T3 are carrying the multicast flow on the same IM pair, AT G receives the multicast flow from T4, and at least potentially can also receive the multicast flow from T3, which can be used for soft-combining. With regard to the control channel, if the system 100 is operating in accordance with DO protocols, soft handoff is not supported, except for the soft-combining related to the downlink BCH, such that AT G only monitors the control channel in its current serving sector. Thus, BOMs (if any) are received at AT G in T4 before the handoff, and BOMs are received (if any) in X1 after the handoff. Thus, AT G continues to monitor the multicast session after the handoff from T4 to X1 based on the BOM received in T4 from before the handoff, 610, if possible.

In 615, the RAN 120 transmits a scheduling message on the control channel within sector X1. In an example, the scheduling message can be a BOM that lists multicast flows being carried on the downlink BCH within X1. For convenience of explanation, the scheduling message will hereinafter be described as a BOM. However, in other multicasting protocols, it will be appreciated that embodiments of the present invention can be directed to any scheduling message that indicates multicast flow status for one or more sectors. Because AT G has handed off to X1, AT G monitors transmissions within X1 and as such receives and decodes the BOM, 620. In an example, assume that the BOM received in 615 at AT G is the first BOM following AT G's entry into the handoff zone between T4 and X1. AT G evaluates the decoded BOM and determines, 625, either that X1 is not carrying the desired multicast flow (e.g., if X1's BOM does not list a BCMCSFlowID and associated BCH IM pair), or that X1 is carrying the desired multicast flow on a different IM pair than sector T4 (e.g., if X1 corresponds to a different cluster for the multicast flow than the cluster illustrated in FIG. 5B). If AT G determines that X1 is not carrying the multicast flow, the process advances to 630. Otherwise, if AT G determines that X1 is carrying the flow on a different IM pair, the process advances to 645 and AT G tunes to the indicated IM pair.

As noted above with respect to 610, because AT G's location at Position 2 of FIG. 6B is within the service boundary of T4, while AT G is setting up the BCH for the multicast session in X1, AT G continues to monitor the multicast session based at least in part on transmissions from T4 and/or other sectors via soft combining of the downlink BCH, based on BCH-transmissions of neighboring-sectors that also carry the multicast flow on the same BCH IM pair as indicated by the previous BOM in T4 received at 545).

The monitoring that begins in 610 is performed at least until a new BOM is decoded for AT G's new sector (e.g., in 645), and can be based on the BOM received in T4 at 545. For example, BOMs may include a list or advertisement of multicast flows carried in neighboring sectors in addition to the local sector transmitting the BOM. Thus, if the BOM transmitted in 545 indicates that neighboring sectors (e.g., T3, etc.) are carrying the multicast flow, AT G soft combines the transmissions from the listed neighboring sector(s) (if possible), carrying the multicast flow, as well as T4's BCH transmissions of the multicast flow, at least until a BOM is received that indicates the new sector is carrying the multicast flow on the IM pair being decoded by AT G. While not illustrated explicitly within FIG. 6A, it is appreciated that if AT G reaches a point at which AT G cannot decode multicast packets associated with the monitored multicast flow, the application layer cannot sufficiently correct errors in the multicast flow and/or the packet error rate reaches an unacceptable level, AT G stops monitoring the flow. Thus, FIG. 6A assumes that the decoding of the flow at AT G is sufficient until AT G's new sector begins to carry the flow itself.

Likewise, while not the case in the present example illustrated in FIG. 6B, if X1 is already carrying the multicast flow on the downlink BCH, X1 would be a target sector and may be listed in the BOM received from T4 on T4's downlink control channel before the handoff to X1. Thus, in an embodiment where AT G hands off from one target sector to another target sector within the same multicast cluster, AT G need not wait to receive a BOM in its new serving sector following the handoff before decoding the downlink BCH if a BOM from its old sector already indicates that the new sector is carrying the multicast flow on the downlink BCH. Thus, although AT G would not yet have the updated list of neighboring sectors for the new sector that carry the multicast flow to use in soft-combining, AT G would at least be able to use its new sector's own transmissions of the multicast flow to soft-combine and perform better decoding prior to receipt of the BOM. Thus, in this case, after handing off from T4 to X1 in 605, AT G can begin decoding multicast messages on the downlink BCH in X1 before the BOM is decoded at 615. Again, this scenario is based on the assumption that AT G is handed off between target sectors within a multicast cluster that both carry the same multicast flow on the same IM pair, and is described in more detail below with respect to FIGS. 9A, 9B and 9C.

Also, even though supporting sectors are not included for soft combining in this example, AT G can soft combine with neighboring target sectors (e.g., listed in the BOM from T4 received at 545 of FIG. 5A) even when a serving target sector is carrying the multicast flow, so long as the multicast flows from the neighbor target sectors remain in range of AT G.

After determining the desired multicast flow is not being carried in X1, AT G transmits an "immediate" registration message (e.g., a BCMCSFlowRegistration message) in X1 to the RAN 120 on the reverse link access channel, 630. As used herein, an "immediate" transmission corresponds to a transmission that is earlier than a predefined, periodic slot that is allocated for registration transmissions. For example, if slot #7 is the predefined, periodic slot for BCMCSFlowRegistration messages, then any of slots #1-#7 may be "immediate" as used herein. For example, the immediate BCMCSFlowRegistration message transmission can occur on a next available slot on the reverse link access channel subsequent to the determination of 620. It is also assumed herein that the RAN 120 is configured to decode the immediate registration message. For example, the RAN 120 can be configured to decode all slots on the reverse link access channel, or alternatively can be configured to decode only the most likely slots where reverse link registration messages are expected, etc. It will be appreciated that there are many different ways in which the RAN 120 can be implemented to ensure receipt of the immediate registration messages described herein.

Figure 6C:
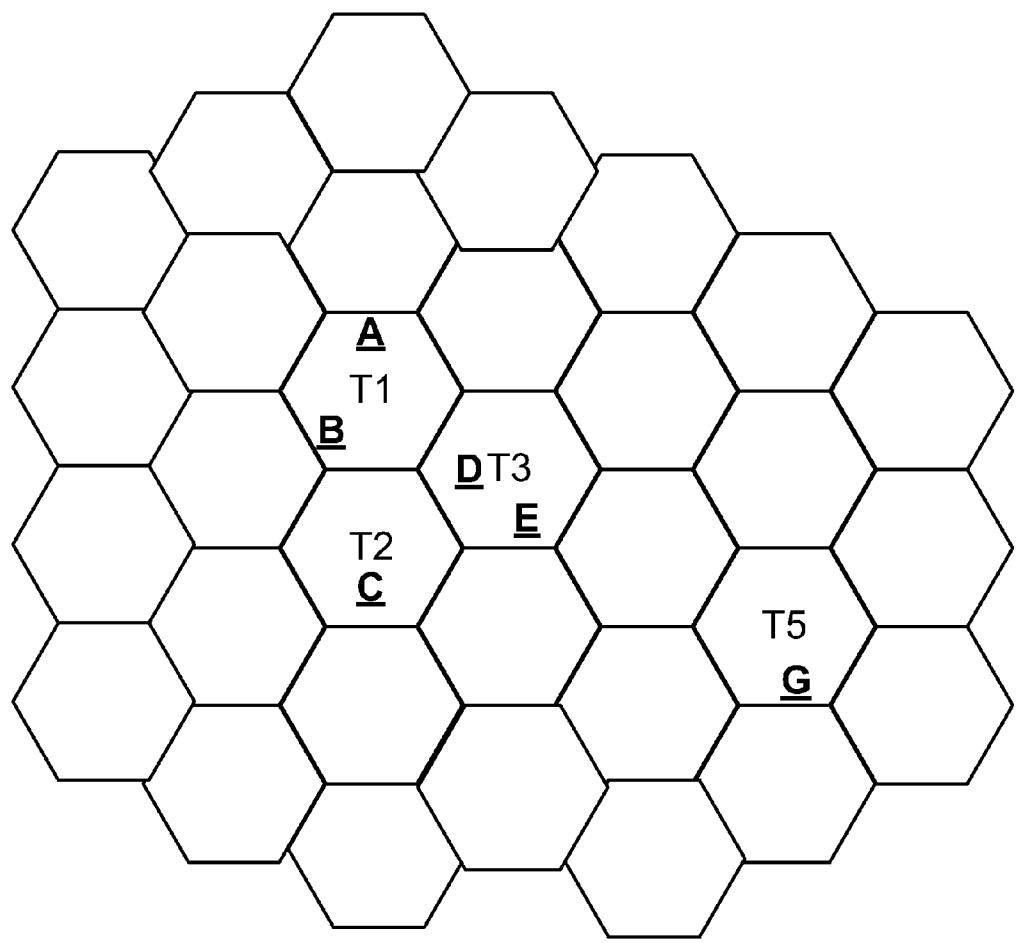
FIG. 6C illustrates an updated version of the example cluster from FIG. 5B after access terminal migration from a target sector to a non-target sector during the process of FIG. 6A according to an embodiment.

Upon receiving the registration request in X1, the RAN 120 transitions X1 to target sector T5, and transitions T4 to a non-target sector, 635 (e.g., because no multicast group members remain in old target sector T4), which means the RAN 120 begins to carry the multicast flow in T5 and ceases to support the multicast flow in T4. It will be appreciated that the transition of T4 to a non-target sector occurs because AT G is the only multicast group member in T4 in the cluster illustrated in FIG. 5B, and AT G then exits the sector T4 and enters sector X1. It will be appreciated that if any multicast group members were to remain in T4 (e.g., if AT D or E were to enter T4 before AT G exited, or a new multicast group member registered to the multicast session in T4), T4 would remain a target sector. Also, the transition of T4 to a non-target sector may be configured to occur at some point after the RAN 120 sends a BOM in T5 (e.g., in 640), so that AT G does not experience a service outage before AT G can tune to the multicast flow in T5. In an example, FIG. 6C illustrates an updated cluster after the transitioning of 635, based on an initial cluster as illustrated in FIG. 5B. The RAN 120 transmits a new scheduling message or BOM that advertises the multicast flow in X1 (now T5), 640, and AT G receives the scheduling message and tunes to the BOM-indicated IM pair on the downlink BCH, 645. It will be appreciated that the RAN 120, if possible, can transmit the multicast flow in X1 (now T5) on the same IM-pair as in any neighboring target sector(s) of the multicast cluster, such that AT G can attempt to soft-combine with multicast transmissions on the downlink BCH in any neighbor target sector as well (e.g., such as T3 if T3 were a neighbor sector of T5, etc.). Also, while not shown explicitly in FIG. 6A, upon receiving the BOM in AT G's new sector (i.e., T5), AT G can update its list of local sectors that are known to carry the multicast flow, which now includes T5 and can include one or more other sectors to be used in soft-combining with T5's multicast flow transmissions. The RAN 120 begins to transmit multicast messages on the BOM-indicated IM pair of the downlink BCH in X1 (now T5), 650, and AT G monitors the multicast messages, 655.

As will be appreciated by one of ordinary skill in the art, because AT G transmits the registration message (e.g., a BCMCSFlowRegistration message) before the fixed, periodic slot reserved for registration messages, the RAN 120 is informed of the presence of a multicast group member in X1 more quickly, such that the multicast flow can be carried In X1 sooner, which reduces the probability that AT G will drop the call. Also, T4 transitions to a non-target sector more quickly, which means that transmissions in T4 cease sooner, which improves a spectral efficiency of the wireless communications system 100.

Figure 7:
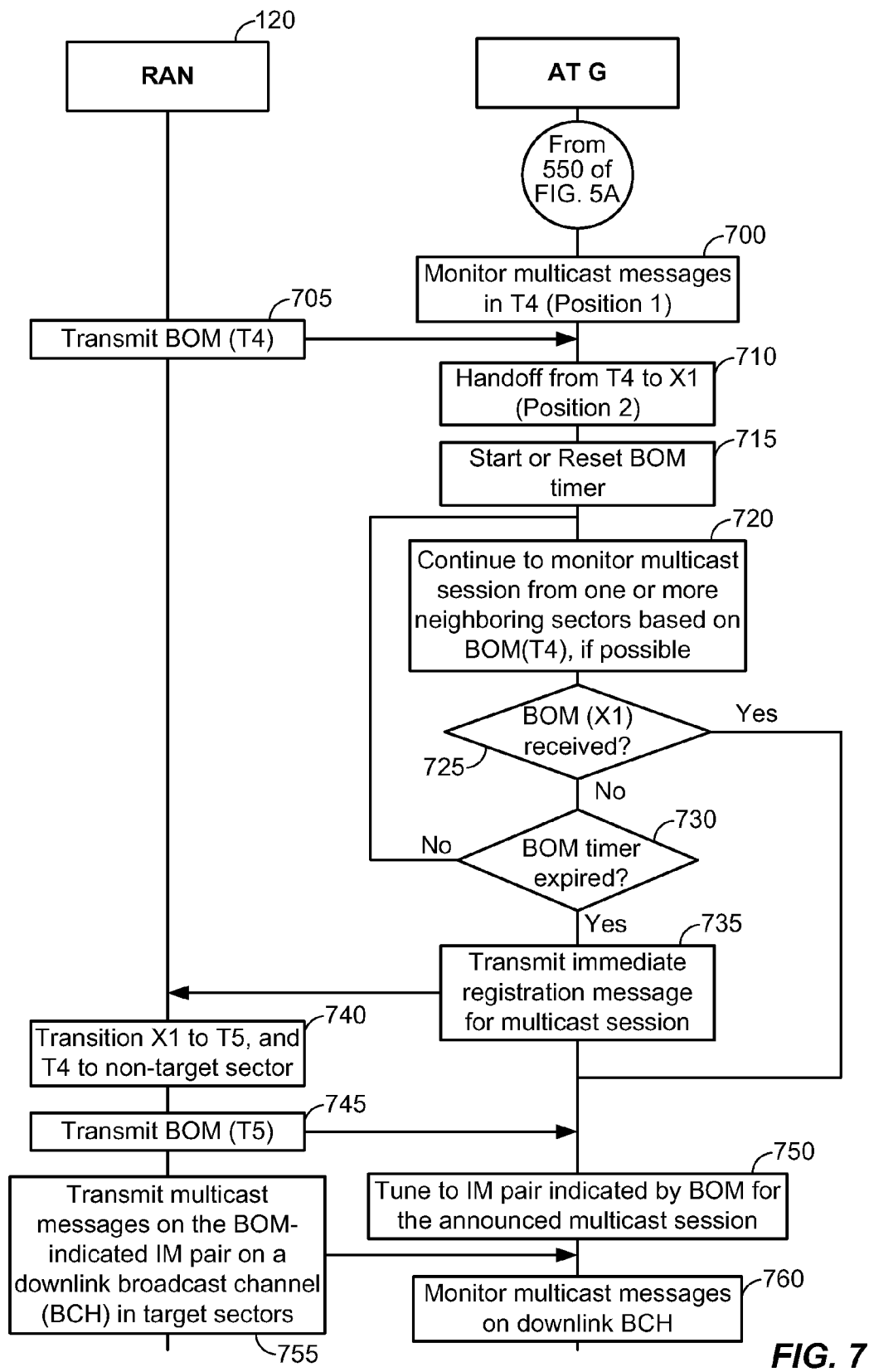
FIG. 7 illustrates BCH setup in a non-target sector for an active multicast session after the process of FIG. 5A according to another embodiment.

In another example, again assume that the process of FIG. 5A is executed and that the cluster of FIG. 5B is actively carrying the multicast flow on a given IM pair. As noted above, in FIG. 5B, T1 to T4 correspond to a group of sectors (e.g., referred to as a "cluster" or "multicast cluster") that carry the multicast flow on the same IM pair, while it is also possible that other clusters (not shown) carry the multicast flow on a different IM pair. With these assumptions, after 550 of FIG. 5A, the process advances to 700 of FIG. 7. FIG. 7 illustrates BCH setup in a non-target sector X1 for an active multicast session according to another embodiment of the present invention. Referring to FIG. 7, in 700, assume AT G is located at Position 1 within target sector T4, as illustrated in FIG. 6B. Next, in 705, the RAN 120 transmits a periodic scheduling message (e.g., a BOM) within T4 that advertises the multicast flow and indicates the IM pair carrying the multicast flow in T4 and any neighboring sectors (e.g., T3). As noted above, if AT G operates in a protocol (e.g., DO) where the control channel is not soft-combined, then the decoding of the periodic scheduling message (e.g., BOM) in 705 occurs prior to the handoff from T4 to X1 in 710. Again, for convenience of explanation, the scheduling message will hereinafter be described as a BOM. However, in other multicasting protocols, it will be appreciated that embodiments of the present invention can be directed to any scheduling message that indicates multicast flow status for one or more sectors.

In 710, AT G moves towards a neighboring sector X1, which is a non-target sector, and crosses a handoff boundary between T4 and X1, and is at Position 2 of FIG. 6B. Accordingly, AT G hands off from sector T4 to X1. In the handoff zone, AT G receives transmissions from one or more base stations in one or more sectors carrying the multicast session. For example, if the BOM transmitted in T4 before the handoff indicates that T4 and T3 are carrying the multicast flow on the same IM pair, AT G receives the multicast flow from T4, and at least potentially can also receive the multicast flow from T3, which can be used for soft-combining. With regard to the control channel, if the system 100 is operating in accordance with DO protocols, soft handoff is not supported, except for the soft-combining related to the downlink BCH, such that AT G only monitors the control channel in its current serving sector. Thus, BOMs (if any) are received at AT G in T4 before the handoff, and BOMs are received (if any) in X1 after the handoff.

After handing off from T4 to X1, AT G resets a BOM timer, 710. In an example, the BOM timer has a period equal to a BroadcastOverheadPeriod (e.g., an expected period between BOM transmissions).

Because AT G is within the handoff zone, AT G monitors transmissions from both T4 and X1. In 720, AT G continues to monitor the multicast session based at least in part on transmissions from T4 and/or other sectors via soft combining of the downlink BCH, (e.g., such as BCH-transmissions of neighboring-sectors that also carry the multicast flow on the same BCH IM pair as indicated by the previous BOM in T4 received at 705). The monitoring that occurs in 720 is performed at least until a new BOM is decoded for AT G's new sector (e.g., in 750), and can be based on the BOM received in T4 at 705. For example, BOMs may include a list or advertisement of multicast flows carried in neighboring sectors in addition to the local sector. Thus, if the BOM transmitted in 705 indicates that neighboring sectors (e.g., T3, etc.) are carrying the multicast flow, AT G soft combines the transmissions from those neighboring sectors (if possible) as well as T4, at least until a BOM is received that indicates the new sector X1 is carrying the multicast flow. However, while not illustrated explicitly within FIG. 7, it is appreciated that if AT G reaches a point at which AT G cannot decode multicast packets associated with the monitored multicast flow, the application layer cannot sufficiently correct errors in the multicast flow and/or the packet error rate reaches an unacceptable level, AT G stops monitoring the flow. Thus, FIG. 7 assumes that the decoding of the flow via soft-combining at AT G is sufficient until AT G's new sector begins to carry the flow itself.

In 725, AT G determines whether a BOM has been received in sector X1 that advertises the multicast flow (e.g., either on the same IM pair as in T4 that is currently being decoded by AT G, or on a different IM pair). If a BOM has been received that advertises the multicast flow, the process advances to 750, and AT G tunes to the IM pair advertises as supporting the multicast flow (e.g., either on the same IM pair as in T4 that is currently being decoded by AT G, or on a different IM pair). While not shown in FIG. 7, if a BOM is received that does not advertise the multicast flow, the process advances to 620 of FIG. 6A. Otherwise, if no BOM has been received in sector X1, the process advances to 730. In 730, AT G determines whether the BOM timer is expired. If the BOM timer is not expired, the process returns to 720, AT G continues to soft-combine transmissions of the multicast flow from one or more other sectors and waits to receive a BOM in sector X2. Otherwise, if the BOM timer is expired, AT G transmits an immediate registration message for the multicast session, 735, as in 630 of FIG. 6A. As discussed above, an "immediate" transmission corresponds to a transmission that is earlier than a predefined, periodic slot that is allocated for registration transmissions based on the wireless multicasting protocol (e.g., 1x EV-DO). 740 through 760 of FIG. 7 correspond to 635 to 655 of FIG. 6A, respectively, which have already been described above. Accordingly, a further description thereof has been omitted for the sake of brevity.

Figure 8:
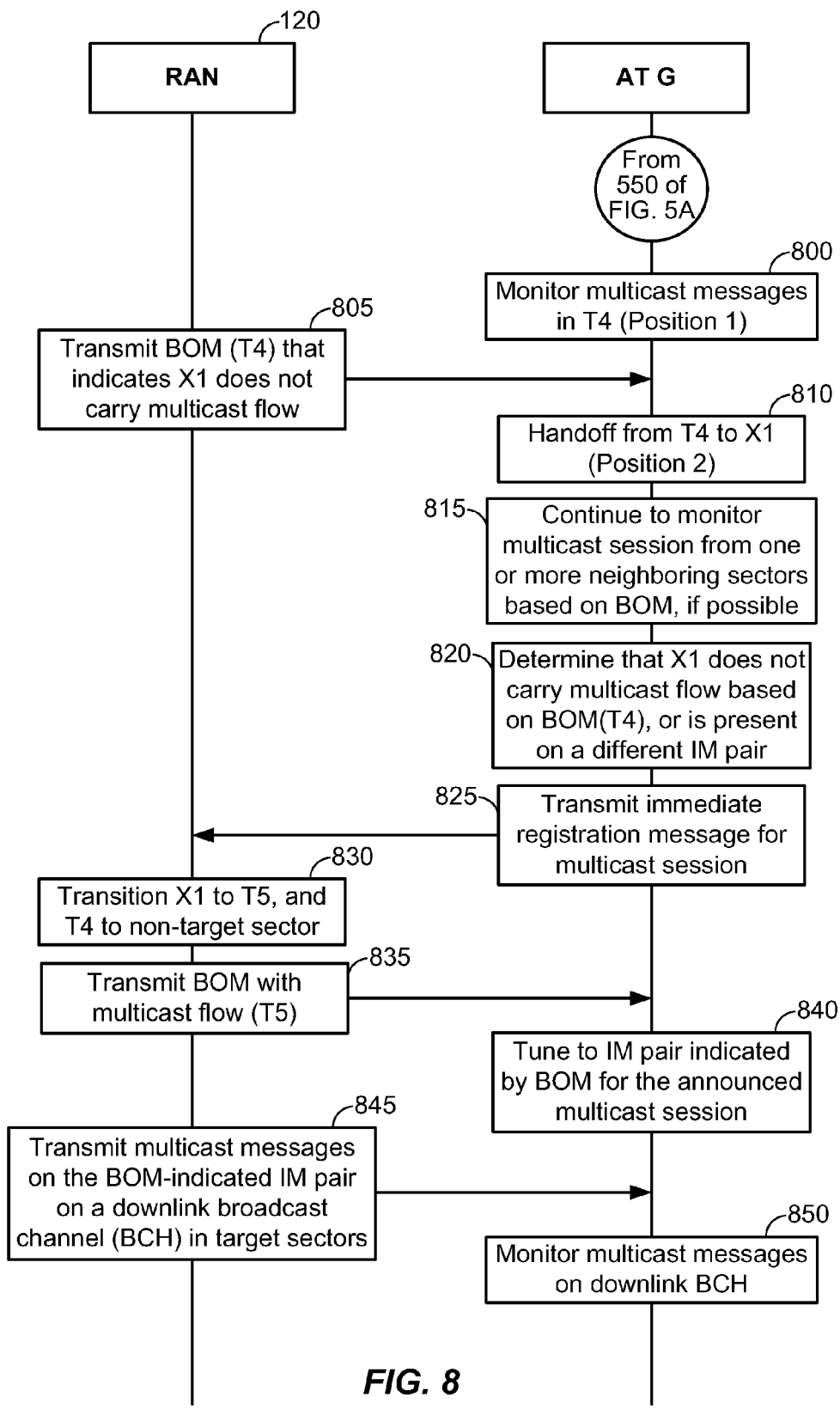
FIG. 8 illustrates BCH setup in a non-target sector for an active multicast session after the process of FIG. 5A according to yet another embodiment.

In yet another example, again assume that the process of FIG. 5A is executed and that the cluster of FIG. 5B is actively carrying the multicast flow on a given IM pair. As noted above, in FIG. 5B, T1 to T4 correspond to a group of sectors (e.g., referred to as a "cluster" or "multicast cluster") that carry the multicast flow on the same IM pair, while it is also possible that other clusters (not shown) carry the multicast flow on a different IM pair. With these assumptions, after 550 of FIG. 5A, the process advances to 800 of FIG. 8. FIG. 8 illustrates BCH setup in a non-target sector X1 for an active multicast session according to yet another embodiment of the present invention. Referring to FIG. 8, in 800, assume AT G is located at Position 1 within target sector T4, as illustrated in FIG. 6B. Next, in 805, the RAN 120 transmits a periodic scheduling message (e.g., a BOM) within T4 that advertises the multicast flow within T4 and indicates the IM pair carrying the multicast flow in T4 and any neighboring sectors (e.g., T3). Within this example, assume that the BOM of 805 indicates either that the multicast session is not being carried in X1 or that the multicast session is not being carried in X1 on the same IM pair as T4. For example, the indication that the multicast session is not carried in X1 can be achieved by configuring the BOM to in T4 to list the neighboring sectors of T4 that carry the multicast flow on the same IM pair as T4, and to omit X1 from this list. It will be appreciated that the failure of the T4 BOM to indicate X1 in this manner indicates either that the multicast flow is not being carried in X1 at all, or is being carried on a different IM pair.

In 810, AT G moves towards the neighboring sector X1, which is a non-target sector, and crosses a handoff boundary between T4 and X1, hands off from T4 to X1, and is at Position 2 of FIG. 6B. In the handoff zone, AT G receives transmissions on the downlink BCH from one or more base stations in one or more sectors carrying the multicast session (e.g., from the base station serving sector T4 so long as T4 remains a target sector, from the base station serving sector X1 if X1 is carrying the multicast flow on the given IM pair as indicated by a BOM from T4 in 805, from one or more neighboring sectors of T4 that carry the multicast flow on the given IM pair as indicated by the BOM from 805, etc.). In 815, AT G continues to monitor the multicast session based at least in part on transmissions from T4, and/or other sectors via soft combining, as described above. The monitoring that occurs in 815 is performed at least until a new BOM is decoded for AT G's new sector (e.g., in 840), and can be based on sectors indicating to be carrying the multicast flow on the given IM pair as determined from the BOM received in T4 at 805. However, while not illustrated explicitly within FIG. 8, it is appreciated that if AT G reaches a point at which AT G cannot decode multicast packets associated with the monitored multicast flow, the application layer cannot sufficiently correct errors in the multicast flow and/or the packet error rate reaches an unacceptable level, AT G stops monitoring the flow. Thus, FIG. 8 assumes that the decoding of the flow via soft-combining at AT G is sufficient until AT G's new sector begins to carry the flow itself.

In 820, upon entry into the handoff zone at Position 2 and handing off to X1, AT G determines that sector X1 either does not carry the multicast flow at all or does not carry the multicast flow on the same given IM pair based on the previously received BOM in T4. As will be appreciated, the determination of 820 in this embodiment is based on a previous BOM received in AT G's old sector T4, and not based on an actual BOM yet received in sector X1. Thus, AT G need not wait to receive a BOM in X1 (e.g., as in FIG. 6A) or an expiration of a BOM timer (e.g., as in FIG. 7) to learn that X1 does not carry the multicast flow. Accordingly, AT G transmits an immediate registration to the RAN 120 in sector X1 subsequent to the handoff in 825, with "immediate" being defined above with respect to 630 of FIGS. 6A and 735 of FIG. 7. Next, 830 through 850 of FIG. 8 correspond to 635 to 655 of FIG. 6A, respectively, which have already been described above. Accordingly, a further description thereof has been omitted for the sake of brevity.

Also, while not shown explicitly in FIG. 8, if AT G determines in 820 that X1 is carrying the multicast flow on a different IM pair than T4, AT G can advance directly to 840 and tune to the different IM pair. Thus, in this case, a registration message need not be sent to prompt the RAN 120 to carry the multicast flow, and AT G can simply tune to the multicast flow on the IM pair that is supporting the flow in the next sector.

As will be appreciated by one of ordinary skill in the art, each of the embodiments illustrated in FIGS. 6A, 7 and 8, respectively, are directed to establishing a multicast flow on a downlink BCH in a non-target sector to which one or more multicast group members migrate during an active multicast session. Instead of waiting for the fixed, periodic slot on which to send registration messages, each of the embodiments illustrated in FIGS. 6A, 7 and 8, respectively, teach different manners by which a non-target status of a newly entered sector can be inferred by an access terminal, thereby triggering a transmission of the registration message that is potentially earlier than the fixed, periodic slot.

Further, while described as separate embodiments, each of the embodiments described with respect to FIGS. 6A, 7 and 8 can be used separately or together. For example, a BOM timer can be reset and used to determine the presence of a multicast flow as in FIG. 7, while BOMs received in the new sector are evaluated as in FIG. 6A.

Further, while FIGS. 6A, 7 and 8 have been directed to embodiments wherein no supporting sectors are included in a multicast cluster, it will be appreciated that the embodiments described above are applicable to any multicast transmission scenario where the multicast flow is carried on a downlink BCH and a multicast group member handoffs from a target sector to a sector that is not carrying the multicast flow. Thus, even if supporting sectors are present in other portions of the cluster for supporting other target sectors (e.g., such as target sectors with especially poor channel conditions, etc.), the embodiments described above can still be implemented where a supporting sector is not present. In this case, the supporting sectors could be used for soft-combining the multicast flow on the downlink BCH, as described above with respect to target sectors. In other words, a BOM in a previous or current sector can advertise a supporting sector carrying the multicast flow on a given IM pair, for which the AT can use to soft-combine the flow, irrespective of whether the advertised sector is a supporting sector or a target sector.

Figure 9A:
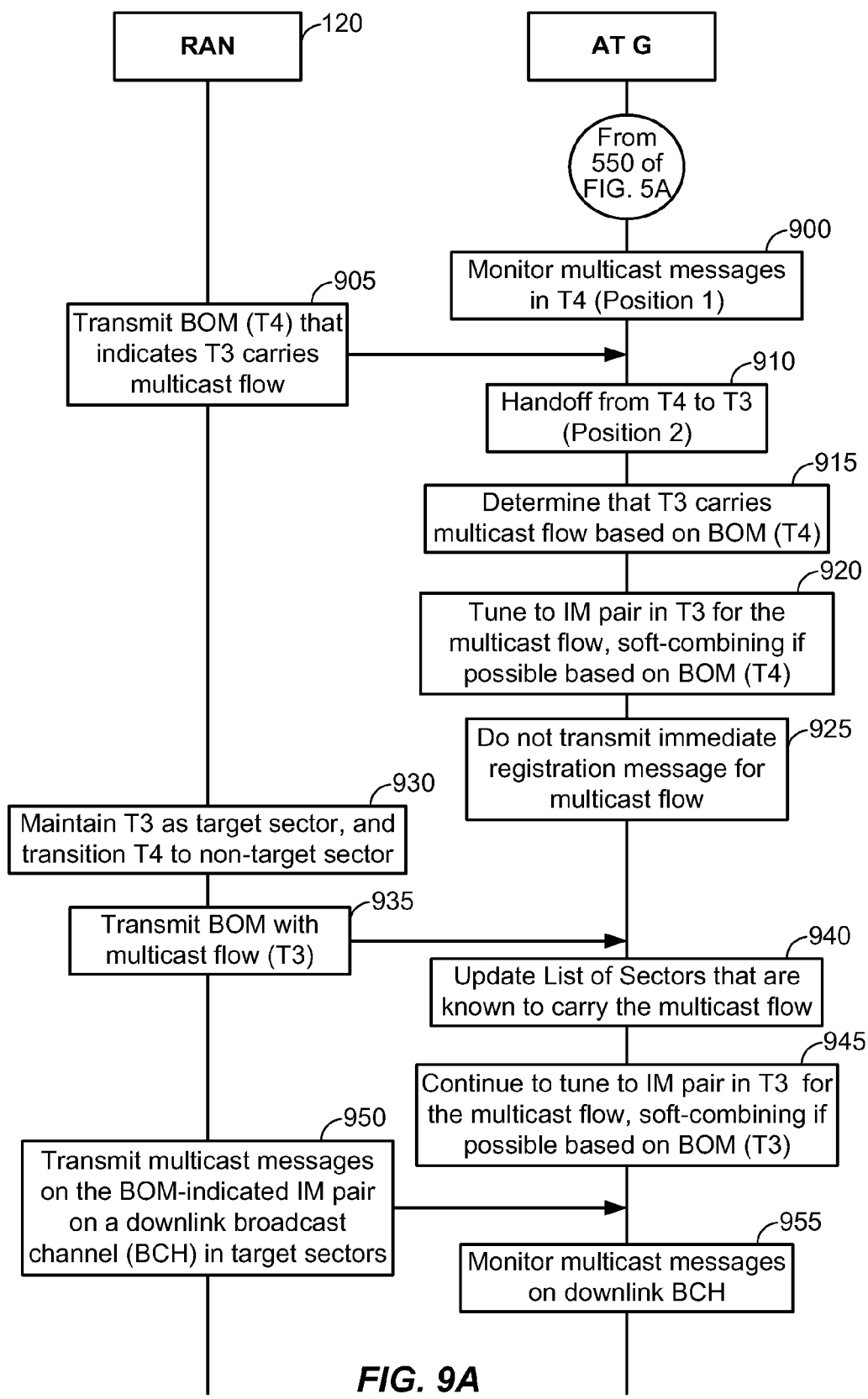
FIG. 9A illustrates BCH setup in a target sector for an active multicast session after the process of FIG. 5A according to an embodiment.

While embodiments of the invention described above are directed to sending immediate registrations for a multicast flow or session when an AT migrates from a target sector to a non-target sector, other embodiments of the invention can be directed to when an AT migrates from a target sector to another target sector, as will now be described with respect to FIGS. 9A through 9C.

As in FIGS. 6A, 7 and 8, again assume that the process of FIG. 5A is executed and that the cluster of FIG. 5B is actively carrying the multicast flow on a given IM pair. As noted above, in FIG. 5B, T1 to T4 correspond to a group of sectors (e.g., referred to as a "cluster" or "multicast cluster") that carry the multicast flow on the same IM pair, while it is also possible that other clusters (not shown) carry the multicast flow on a different IM pair. With these assumptions, after 550 of FIG. 5A, the process advances to 900 of FIG. 9A. FIG. 9 illustrates BCH setup for an AT ("AT G") that migrates from a current target sector T4 to an adjacent target sector T3 according to yet another embodiment of the present invention. Referring to FIG. 9A, in 900, assume AT G is located at Position 1 within target sector T4, as illustrated in FIG. 9B. Next, in 905, the RAN 120 transmits a periodic scheduling message (e.g., a BOM) within T4 that advertises the multicast flow within T4 and indicates the IM pair carrying the multicast flow in T4 and any neighboring sectors (e.g., T3). Within this example, assume that the BOM of 905 indicates that the multicast session is being carried at least within sectors T4 and T3 on the same IM pair.

Figure 9B:
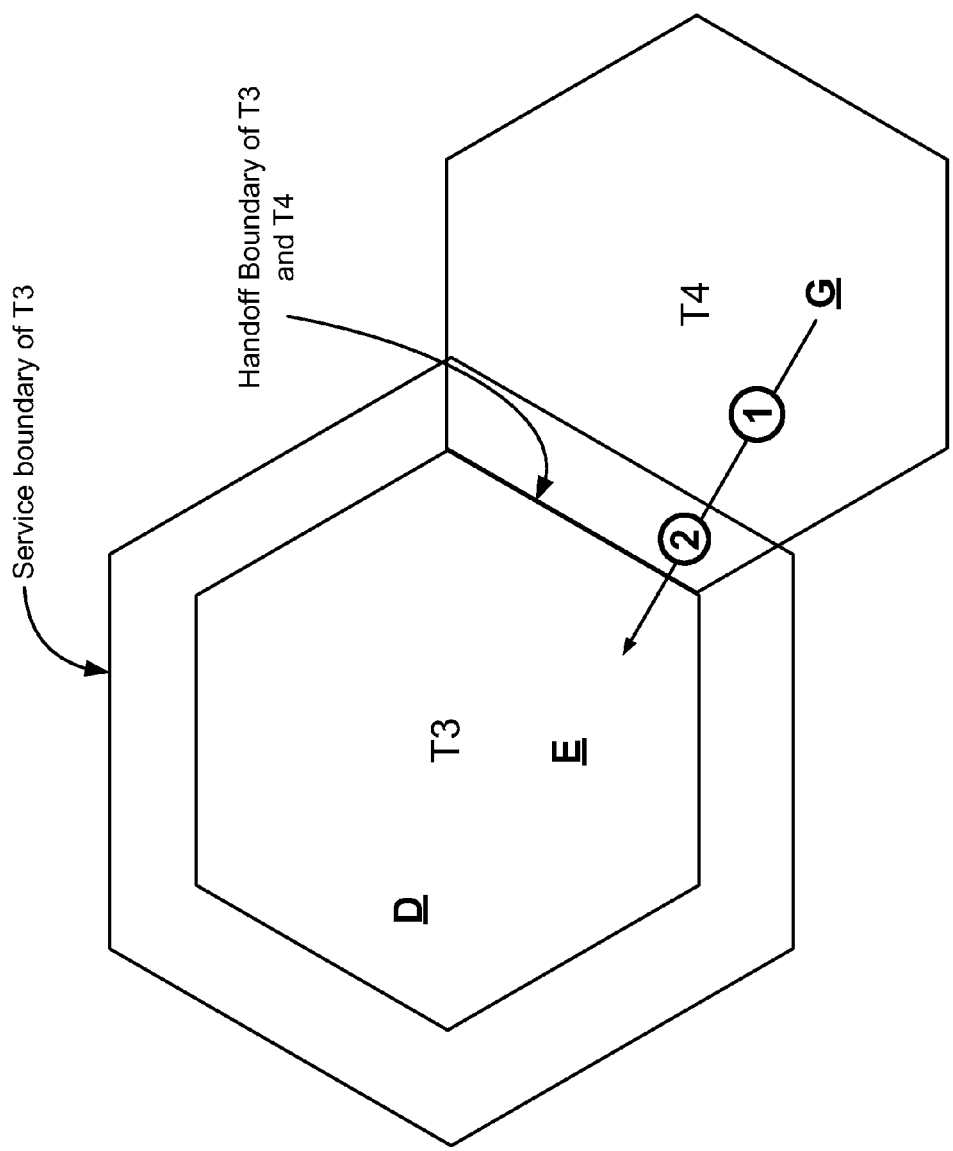
FIG. 9B illustrates a portion of the example cluster from FIG. 5B during the process of FIG. 9A according to an embodiment.
Figure 9C:
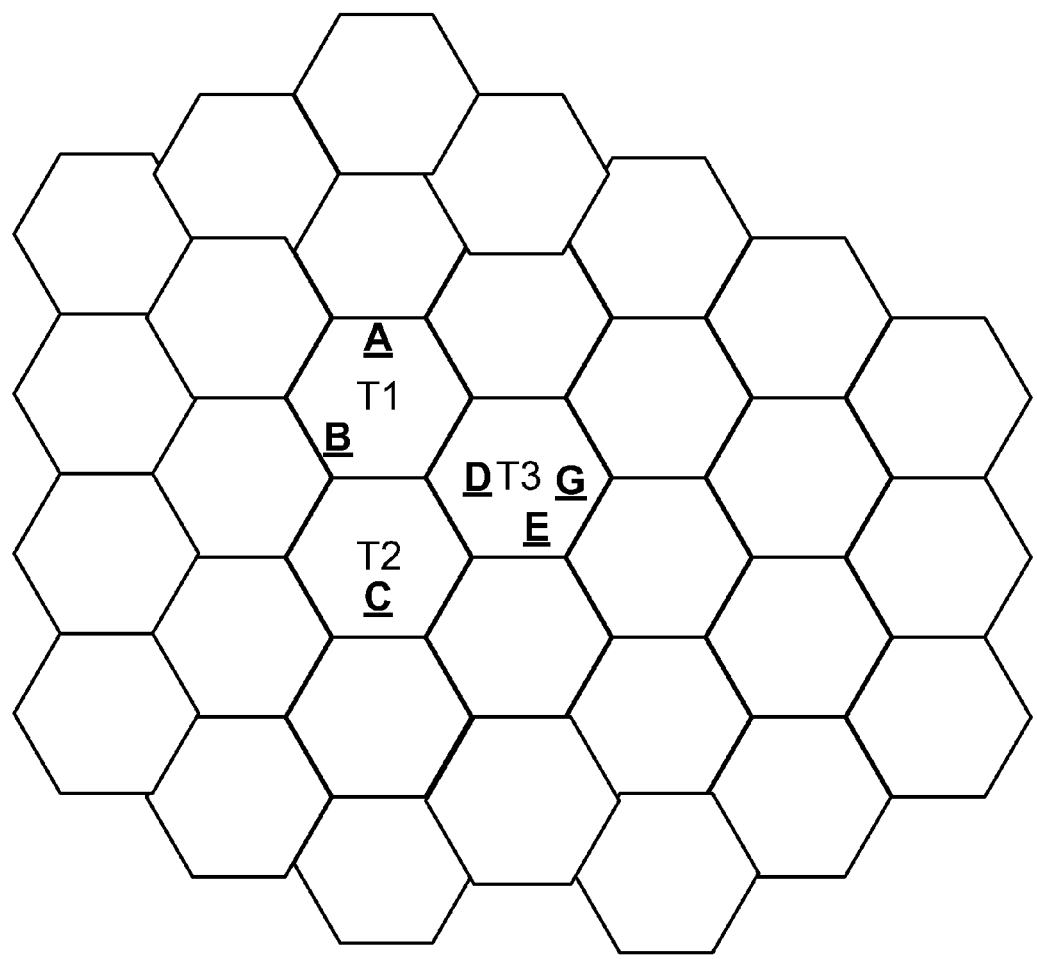
FIG. 9C illustrates an updated version of the example cluster from FIG. 5B after access terminal migration between target sectors during the process of FIG. 9A according to an embodiment.

In 910, AT G moves towards the target sector T3, crosses a handoff boundary between T4 and T3, hands off from T4 to T3, and is at Position 2 of FIG. 9B. In the handoff zone, AT G receives transmissions on the downlink BCH on the monitored IM pair from both the base station serving sector T4 (e.g., for so long as T4 remains a target sector), and from the base station serving sector T3 because T3 is carrying the multicast flow on the given IM pair as indicated by a BOM from T4 in 905, and/or from one or more other neighboring sectors of T4 that carry the multicast flow on the given IM pair as indicated by the BOM from 905.

In 915, upon entry into the handoff zone at Position 2 and handing off to T3, AT G determines that sector T3 is carrying the multicast flow on the same IM pair that is already being monitored by AT G based on the previous BOM that is received in target sector T4 before the handoff of 910. Thus, as will be appreciated, the determination of 915 in this embodiment is based on a previous BOM received in AT G's old sector T4, and not based on an actual BOM yet received AT G's new sector T3. Thus, AT G need not wait to receive a BOM in T3 or an expiration of a BOM timer to learn that T3 is already carrying the multicast flow on the given IM pair. Accordingly, AT G tunes (or continues to tune) to the IM pair of the downlink BCH in target sector T3, and if possible can soft combine with one or more other sectors (e.g., such as T4) to increase the decode success rate, 920. For example, AT G can soft combine with multicast flow transmissions on the downlink BCH of the given IM pair from target sector T4 (e.g., until these transmissions terminate in 930), as well as potentially one or more neighboring sectors that are indicated in the BOM received T4 at 905 that are also indicated as carrying the multicast flow at the given IM pair.

Because AT G is already aware that T3 is a target sector (i.e., from the BOM in T4 at 905), AT G may refrain from sending an immediate registration for the multicast flow in T3, 925. Thus, unlike FIGS. 6A, 7 and 8, wherein AT G infers a new sector to be a non-target sector and sends a preemptive or more immediate registration message (e.g., BCMCSFlow-Registration message), in 925 of FIG. 9, the opposite conclusion is reached by AT G such that no registration message need be sent. However, while not shown in FIG. 9A, AT G may start a timer, which may or may not have the same duration as the BOM timer from FIG. 7, and may send a registration if the timer expires. Thus, if the BOM in T4 indicates that T3 is carrying the multicast flow, but T3 has since stopped carrying the multicast flow, AT G can still obtain the multicast flow in T3 despite T4's BOM from 905 acting as a 'false-positive' of target sector-status for AT G's new sector in this case.

Turning to the RAN 120, after handing off AT G from target sector T4 to target sector T3, the RAN 120 maintains target sector T3 as a target sector, and transitions T4 to a non-target sector, 930 (e.g., because no multicast group members remain in old target sector T4). It will be appreciated that the transition of T4 to a non-target sector occurs because AT G is the only multicast group member in T4 in the cluster illustrated in FIG. 9B, and AT G then exits the sector T4 and enters sector T3. It will be appreciated that if any multicast group members were to remain in T4 (e.g., if AT D or E were to enter T4 before AT G exited, or a new multicast group member registered to the multicast session in T4), T4 would remain a target sector. In an example, FIG. 9C illustrates an updated cluster after the transitioning of 930, based on an initial cluster as illustrated in FIG. 5B.

The RAN 120 transmits a new scheduling message or BOM that advertises the multicast flow in target sector T3 as well as any neighboring sectors that carry the multicast flow on a given IM pair, 935, and AT G receives the scheduling message and updates its list of local sectors that are known to carry the multicast flow, 940. For example, the updated list continues to include target sector T3, which was also listed in the BOM in T4 at 905. The updated list now omits target sector T4 because T4 has transitioned to a non-target sector. The updated list may potentially include other neighboring sectors carrying the multicast flow as well, such as T1 and/or T2. It will be appreciated that due to scheduling on the BCH, it may not always be possible for the RAN 120 to schedule the multicast flow in T3 on the same IM pair as in T4. Thus, it is possible that the BOM sent in T3, 935, may advertise the multicast flow on a different IM pair than in T4.

In 945, AT G continues to tune to the BOM-indicated IM pair on the downlink BCH in T3, and also soft-combines with other sectors indicated as carrying the multicast flow in the BOM of 935, if possible, 945. It will be appreciated that the RAN 120, if possible, can transmit the multicast flow in T3 on the same IM-pair as in any neighboring target sector(s) of the multicast cluster, such that AT G can attempt to soft-combine with multicast transmissions on the downlink BCH in any neighbor target sector as well (e.g., such as T2 if T2 were a neighbor sector of T3, etc.). Also, if the BOM of 935 advertises the multicast flow on a different IM pair than the previous IM pair from the BOM of 905, then AT G switches to the new IM pair. If this occurs, soft combining with the 'old' IM pair is not necessarily possible, although AT G may be able to soft combine with other sectors that also transmit the multicast flow on the new IM pair indicated in 935.

The RAN 120 continues to transmit multicast messages on the BOM-indicated IM pair of the downlink BCH in T3 (e.g., and potentially one or more other sectors for use in soft-combining at AT G), 950, and AT G monitors the multicast messages, 955.

Accordingly, in the embodiment of FIG. 9A, it will be appreciated that the level of traffic on the reverse link access channel is reduced due to AT G refraining from sending a registration message in 925 (i.e., because AT G's new sector was already a target sector carrying the multicast flow on the same IM pair as AT G's old sector). Also, because AT G was aware as soon as handoff occurred in 910 that AT G's new sector was a target sector (i.e., 915), AT G began decoding the downlink BCH for the multicast flow in T3 more quickly (i.e., at 920 of FIG. 9A) than if AT G had waited for a next BOM in the target sector T3 in 950 (i.e., after 935 of FIG. 9A).

Accordingly, as will be appreciated by one of ordinary skill in the art in view of the embodiments described above, when a given AT monitoring a multicast session hands off to a new sector, the given AT determines whether the new sector is already supporting the multicast session on the same IM pair as the given AT's old sector based on (i) a BOM received in the new sector (e.g., FIG. 6A), (ii) a BOM received in the old sector (e.g., see FIG. 8 and/or FIG. 9A), and/or (iii) by a BOM timer expiring before a BOM in the new sector is received (e.g., see FIG. 7), and/or any combination of (i), (ii) or (iii). If the new sector is determined to already be supporting the multicast flow on the same IM pair as the old sector, the given AT may refrain from sending a registration message (e.g., see FIG. 9A). Otherwise, if the new sector is determined not to be supporting the multicast flow on the same IM pair as the old sector based on (i), (ii) and/or (iii), an "immediate" registration message can be sent from the given AT to the RAN 120 in the new sector (e.g., see 630 of FIG. 6A, 735 of FIG. 7 and/or 825 of FIG. 8), which can prompt the new sector to carry the multicast flow more quickly. Also, while the given AT waits for the new sector to carry the multicast flow, the given AT can monitor the downlink BCH transmission for the multicast flow on the given IM pair for one or more sectors based on a BOM received in the given AT's old sector before the handoff (e.g., see 625 of FIG. 6A, 720 of FIG. 7 and/or 815 of FIG. 8), such that the probability of the given AT dropping the multicast flow before it is carried in the new sector is reduced.

Further, a 'non-target sector' as described above has been described relative to a particular multicast flow. Thus, in embodiments described above, a sector qualifies a non-target sector if the sector does not carry a particular multicast flow. However, it will be appreciated that this may mean that the non-target sector does not carry any multicast flows in certain embodiments, while this may alternatively mean that the non-target sector carries at least one multicast flow, but not the multicast flow relevant to the particular embodiment being discussed. Thus, a non-target sector may carry one or more multicast flows for multicast sessions other than the multicast session at issue.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of multicasting within a wireless communications system operating in accordance with a given wireless communication protocol, comprising:
   monitoring multicast messages associated with a given multicast session in a first sector;
   handing off from the first sector to a second sector;
   determining, after the handoff, whether the second sector is transmitting multicast messages associated with the given multicast session; and
   transmitting, based on the determination, a registration request within the second sector for the given multicast session on a reverse link access channel in an earlier slot than a next designated slot for registration requests as defined by the given wireless communication protocol without being explicitly authorized to use the earlier slot by the second sector.

2. The method of claim 1, wherein the first sector is one of a plurality of target sectors within the wireless communications system at least before the handoff, and the second sector is not one of the plurality of target sectors at least before the handoff, and wherein target sectors are sectors that are transmitting multicast messages associated with the given multicast session and non-target sectors are sectors that are not transmitting multicast messages associated with the given multicast session.

3. The method of claim 1, wherein the first sector is adjacent to the second sector.

4. The method of claim 1, wherein the handing off hands off an access terminal in a handoff zone where the access terminal remains within a service boundary of the first sector.

5. The method of claim 4, further comprising:
   continuing to monitor the multicast messages associated with the given multicast session from at least one sector other than the second sector while in the handoff zone.

6. The method of claim 5, wherein the continuing to monitor includes soft combining the multicast messages from the first sector with multicast messages received from one or more other sectors.

7. The method of claim 5, wherein, after the handoff, the monitoring continues until (i) the access terminal cannot decode multicast packets associated with the given multicast session, an application layer cannot sufficiently correct errors in the given multicast session or a packet error rate reaches an unacceptable level, or (ii) a scheduling message is received within the second sector that advertises the given multicast session as carried in the second sector, and further indicates how the access terminal can tune to the given multicast session in the second sector.

8. The method of claim 1, wherein the determining includes receiving a scheduling message in the second sector after the handoff that indicates either that (i) the second sector is not transmitting multicast messages associated with the given multicast session, or that (ii) the second sector is transmitting multicast messages associated with the given multicast session on a different Interlace-Multiplex (IM) pair than in the first sector.

9. The method of claim 8, wherein, if the scheduling message received in the second sector after the handoff indicates that the second sector is not transmitting multicast messages associated with the given multicast session, the received scheduling message is a broadcast overhead message (BOM) that does not advertise a flow identifier (ID) and Interlace-Multiplex (IM) pair of the given multicast session for the second sector.

10. The method of claim 8, wherein, if the scheduling message received in the second sector after the handoff indicates that the second sector is transmitting multicast messages associated with the given multicast session on a different IM pair than in the first sector, further comprising:
    monitoring the multicast messages on the different IM pair in the second sector.

11. The method of claim 1, wherein the determining includes:
    starting a timer having a given expiration period after the handoff;
    determining that the second sector is not transmitting multicast messages associated with the given multicast session if the timer expires before a scheduling message is received in the second sector after the handoff.

12. The method of claim 11, wherein the given expiration period is equal to a period between expected scheduling message transmissions from an access network that is associated with the given multicast session.

13. The method of claim 11, wherein the scheduling message transmissions correspond to broadcast overhead messages (BOMs), and the given expiration period is a BroadcastOverheadPeriod.

14. The method of claim 11, further comprising:
    continuing to monitor the multicast messages associated with the given multicast session from at least one sector other than the second sector while in a handoff zone.

15. The method of claim 1, wherein, after the handoff, the monitoring continues until (i) an access terminal cannot decode multicast packets associated with the given multicast session, an application layer cannot sufficiently correct errors in the given multicast session or a packet error rate reaches an unacceptable level, or (ii) a scheduling message is received within the second sector that advertises the given multicast session as carried in the second sector, and further indicates how the access terminal can tune to the given multicast session in the second sector.

16. The method of claim 1, wherein the determining includes:
    receiving, before the handoff, a scheduling message within the first sector, and
    determining, from the scheduling message, either that (i) the second sector is not transmitting multicast messages associated with the given multicast session, or that (ii) the second sector is transmitting multicast messages associated with the given multicast session on a different Interlace-Multiplex (IM) pair than in the first sector.

17. The method of claim 16, wherein, if the scheduling message received in the first sector before the handoff indicates that the second sector is not transmitting multicast messages associated with the given multicast session, the received scheduling message is a broadcast overhead message (BOM) that does not advertise a flow identifier (ID) and Interlace-Multiplex (IM) pair of the given multicast session for the second sector.

18. The method of claim 16, wherein, if the scheduling message received in the first sector before the handoff indicates that the second sector is transmitting multicast messages associated with the given multicast session on a different IM pair than in the first sector, further comprising:
    monitoring the multicast messages on the different IM pair in the second sector after the handoff.

19. The method of claim 1, further comprising:
receiving, in response to the transmitted registration request, a scheduling message that indicates the second sector is transmitting multicast messages associated with the given multicast session; and
monitoring additional multicast messages associated with the given multicast session in the second sector based on the received scheduling message.

20. The method of claim 19, wherein the received scheduling message is a broadcast overhead message (BOM) that indicates an interlace-multiplex (IM) pair of a downlink broadcast channel (BCH) that is carrying the multicast messages, and the monitoring tunes to the BOM-indicated IM pair to monitor for the multicast messages.

21. The method of claim 1, wherein the earlier slot is a next available slot on the reverse link access channel after the determination.

22. The method of claim 1, further comprising:
monitoring, after the handoff, the given multicast session based on soft-combining with one or more flows of the given multicast session transmitted from at least one sector other than the second sector at least until the second sector carries the given multicast session.

23. The method of claim 22, wherein, after the handoff, the monitoring continues until (i) an access terminal cannot decode multicast packets associated with the given multicast session, an application layer cannot sufficiently correct errors in the given multicast session or a packet error rate reaches an unacceptable level, or (ii) a scheduling message is received within the second sector that advertises the given multicast session as carried in the second sector, and further indicates how the access terminal can tune to the given multicast session in the second sector.

24. A method of multicasting within a wireless communications system operating in accordance with a given wireless communication protocol, comprising:
transmitting multicast messages associated with a given multicast session in a cluster with at least one sector, each sector within the cluster being a target sector expected to include at least one access terminal that has registered for the given multicast session; and
receiving, within a sector outside of the cluster on a reverse link access channel, a registration request for the given multicast session, the wireless communication protocol defining a given portion of the reverse link access channel for registration requests, the received registration request being received in an earlier portion of the reverse link access channel than the given portion without explicit authorization from the sector for access terminals within the sector to use the earlier slot for registration request transmissions associated with the given multicast session.

25. The method of claim 24, wherein each sector within the cluster transmits the given multicast messages on the same interlace-multiplex (IM) pair.

26. The method of claim 25, wherein at least one additional cluster is present within the wireless communications system that transmits multicast messages associated with the given multicast session on a different IM pair.

27. The method of claim 26, wherein the receiving receives the registration request from an access terminal that previously registered to the given multicast session in a given target sector belonging to the cluster.

28. The method of claim 26, wherein the cluster and the at least one additional cluster includes zero supporting sectors.

29. The method of claim 24, wherein the cluster includes zero supporting sectors.

30. A method of multicasting within a wireless communications system operating in accordance with a given wireless communication protocol, comprising:
receiving, before a handoff from a first sector to a second sector, a first scheduling message within the first sector that indicates that the second sector is not transmitting multicast messages associated with a given multicast session; and
transmitting, after ending the handoff by completing the handoff to the second sector, a registration request for the given multicast session within the second sector based on the received scheduling message.

31. The method of claim 30, wherein the transmitting occurs before a second scheduling message is received within the second sector after completing the handoff.

32. The method of claim 30, wherein the first scheduling message indicates either that the second sector is not transmitting multicast messages associated with the given multicast session, or that the second sector is not transmitting multicast messages associated with the given multicast session on the same Interlace-Multiplex (IM) pair as the multicast messages that are transmitted within the first sector.

33. The method of claim 30, wherein the first scheduling message corresponds to a broadcast overhead message (BOM), and the registration request corresponds to a Broadcast and Multicast Service (BCMCS) Flow Registration message.

34. The method of claim 30, further comprising:
monitoring, after completing the handoff, the given multicast session based on soft-combining with one or more flows of the given multicast session transmitted from at least one sector other than the second sector at least until the second sector carries the given multicast session.

35. The method of claim 34, wherein, after the handoff, the monitoring continues until (i) an access terminal cannot decode multicast packets associated with the given multicast session, an application layer cannot sufficiently correct errors in the given multicast session or a packet error rate reaches an unacceptable level, or (ii) a second scheduling message is received within the second sector that advertises the given multicast session as carried in the second sector, and further indicates how the access terminal can tune to the given multicast session in the second sector.

36. A apparatus for multicasting within a wireless communications system operating in accordance with a given wireless communication protocol, comprising:
means for monitoring multicast messages associated with a given multicast session in a first sector;
means for handing off from the first sector to a second sector;
means for determining, after the handoff, whether the second sector is transmitting multicast messages associated with the given multicast session; and
means for transmitting, based on the determination, a registration request within the second sector for the given multicast session on a reverse link access channel in an earlier slot than a next designated slot for registration requests as defined by the given wireless communication protocol without being explicitly authorized to use the earlier slot by the second sector.

37. The apparatus of claim 36, wherein the first sector is one of a plurality of target sectors within the wireless communications system at least before the handoff, and the second sector is not one of the plurality of target sectors at least before the handoff, and
wherein target sectors are sectors that are transmitting multicast messages associated with the given multicast session and non-target sectors are sectors that are not transmitting multicast messages associated with the given multicast session.

38. The apparatus of claim 36, wherein the means for handing off is configured to hand off an access terminal in a handoff zone where the access terminal remains within a service boundary of the first sector.

39. The apparatus of claim 38, further comprising:
means for continuing to monitor the multicast messages associated with the given multicast session from at least one sector other than the second sector while in the handoff zone.

40. The apparatus of claim 39, wherein the means for continuing to monitor includes means for soft combining the multicast messages from the first sector with multicast messages received from one or more other sectors.

41. A non-transitory computer-readable storage medium comprising instructions, which, when executed by at least one processor provide for multicasting within a wireless communications system operating in accordance with a given wireless communication protocol, the instructions comprising:
instructions to monitor multicast messages associated with a given multicast session in a first sector;
instructions to hand off from the first sector to a second sector;
instructions to determine, after the handoff, whether the second sector is transmitting multicast messages associated with the given multicast session; and
instructions to transmit, based on the determination, a registration request within the second sector for the given multicast session on a reverse link access channel in an earlier slot than a next designated slot for registration requests as defined by the wireless communication protocol without being explicitly authorized to use the earlier slot by the second sector.

42. The non-transitory computer-readable storage medium of claim 41, wherein the first sector is one of a plurality of target sectors within the wireless communications system at least before the handoff, and the second sector is not one of the plurality of target sectors at least before the handoff, and
wherein target sectors are sectors that are transmitting multicast messages associated with the given multicast session and non-target sectors are sectors that are not transmitting multicast messages associated with the given multicast session.

43. The non-transitory computer-readable storage medium of claim 41, wherein the instructions to hand off are configured to hand off an access terminal in a handoff zone where the access terminal remains within a service boundary of the first sector.

44. The non-transitory computer-readable storage medium of claim 43, further comprising:
instructions to continue to monitor the multicast messages associated with the given multicast session from at least one sector other than the second sector while in the handoff zone.

45. The non-transitory computer-readable storage medium of claim 44, wherein the instructions to continue to monitor includes instructions for soft combining the multicast messages from the first sector with multicast messages received from one or more other sectors.

46. An apparatus configured to provide for multicasting within a wireless communications system operating in accordance with a given wireless communication protocol, the apparatus comprising:
logic configured to monitor multicast messages associated with a given multicast session in a first sector;
logic configured to hand off from the first sector to a second sector;
logic configured to determine, after the handoff, whether the second sector is transmitting multicast messages associated with the given multicast session; and
logic configured to transmit, based on the determination, a registration request within the second sector for the given multicast session on a reverse link access channel in an earlier slot than a next designated slot for registration requests as defined by the given wireless communication protocol without being explicitly authorized to use the earlier slot by the second sector.

47. The apparatus of claim 46, wherein the first sector is one of a plurality of target sectors within the wireless communications system at least before the handoff, and the second sector is not one of the plurality of target sectors at least before the handoff, and
wherein target sectors are sectors that are transmitting multicast messages associated with the given multicast session and non-target sectors are sectors that are not transmitting multicast messages associated with the given multicast session.

48. The apparatus of claim 46, wherein the logic configured to hand off is configured to hand off an access terminal in a handoff zone where the access terminal remains within a service boundary of the first sector.

49. The apparatus of claim 48, further comprising:
logic configured to continue to monitor the multicast messages associated with the given multicast session from at least one sector other than the second sector while in the handoff zone.

50. The apparatus of claim 49, wherein the logic configured to continue to monitor includes logic configured for soft combining the multicast messages from the first sector with multicast messages received from one or more other sectors.

51. An apparatus for multicasting within a wireless communications system operating in accordance with a given wireless communication protocol, comprising:
means for transmitting multicast messages associated with a given multicast session in a cluster with at least one sector, each sector within the cluster being a target sector expected to include at least one access terminal that has registered for the given multicast session; and
means for receiving, within a sector outside of the cluster on a reverse link access channel, a registration request for the given multicast session, the wireless communication protocol defining a given portion of the reverse link access channel for registration requests, the received registration request being received in an earlier portion of the reverse link access channel than the given portion without explicit authorization from the sector for access terminals within the sector to use the earlier slot for registration request transmissions associated with the given multicast session.

52. A non-transitory computer-readable storage medium comprising instructions, which, when executed by at least one processor provide for multicasting within a wireless communications system operating in accordance with a given wireless communication protocol, the instructions comprising:
instructions to transmit multicast messages associated with a given multicast session in a cluster with at least one sector, each sector within the cluster being a target sector expected to include at least one access terminal that has registered for the given multicast session; and
instructions to receive, within a sector outside of the cluster on a reverse link access channel, a registration request for the given multicast session, the given wireless communication protocol defining a given portion of the reverse link access channel for registration requests, the received registration request being received in an earlier portion of the reverse link access channel than the given portion without explicit authorization from the sector for one or more access terminals within the sector to use the earlier portion for registration request transmissions associated with the given multicast session.

53. An apparatus configured for multicasting within a wireless communications system operating in accordance with a given wireless communication protocol, comprising:
  logic configured to transmit multicast messages associated with a given multicast session in a cluster with at least one sector, each sector within the cluster being a target sector expected to include at least one access terminal that has registered for the given multicast session; and
  logic configured to receive, within a sector outside of the cluster on a reverse link access channel, a registration request for the given multicast session, the wireless communication protocol defining a given portion of the reverse link access channel for registration requests, the received registration request being received in an earlier portion of the reverse link access channel than the given portion without explicit authorization from the sector for access terminals within the sector to use the earlier slot for registration request transmissions associated with the given multicast session.

54. An apparatus for multicasting within a wireless communications system operating in accordance with a given wireless communication protocol, comprising:
  means for receiving, before a handoff from a first sector to a second sector, a first scheduling message within the first sector that indicates that the second sector is not transmitting multicast messages associated with a given multicast session, and
  means for transmitting, after ending the handoff by completing the handoff to the second sector, a registration request for the given multicast session within the second sector based on the received scheduling message.

55. A non-transitory computer-readable storage medium comprising instructions, which, when executed by at least one processor provide for multicasting within a wireless communications system operating in accordance with a given wireless communication protocol, the instructions comprising:
  instructions to receive, before a handoff from a first sector to a second sector, a first scheduling message within the first sector that indicates that the second sector is not transmitting multicast messages associated with a given multicast session, and
  instructions to transmit, after ending the handoff by completing the handoff to the second sector, a registration request for the given multicast session within the second sector based on the received scheduling message.

56. An apparatus configured for multicasting within a wireless communications system operating in accordance with a given wireless communication protocol, the apparatus comprising:
  logic configured to receive, before a handoff from a first sector to a second sector, a first scheduling message within the first sector that indicates that the second sector is not transmitting multicast messages associated with a given multicast session, and
  logic configured to transmit, after ending the handoff by completing the handoff to the second sector, a registration request for the given multicast session within the second sector based on the received scheduling message.

57. A method of multicasting within a wireless communications system operating in accordance with a given wireless communication protocol, comprising:
  monitoring multicast messages associated with a given multicast session in a first sector;
  handing off from the first sector to a second sector;
  starting a timer having a given expiration period after the handoff;
  determining that the second sector is not transmitting multicast messages associated with the given multicast session if the timer expires before a scheduling message is received in the second sector after the handoff; and
  transmitting, based on the determination, a registration request within the second sector for the given multicast session on a reverse link access channel in an earlier slot than a next designated slot for registration requests as defined by the given wireless communication protocol.

58. The method of claim 57, wherein the given expiration period is equal to a period between expected scheduling message transmissions from an access network that is associated with the given multicast session.

59. The method of claim 57, wherein the scheduling message transmissions correspond to broadcast overhead messages (BOMs), and the given expiration period is a BroadcastOverheadPeriod.

60. The method of claim 57, further comprising:
  continuing to monitor the multicast messages associated with the given multicast session from at least one sector other than the second sector while in the handoff zone.

* * * * *

UNITED STATES PATENT AND TRADEMARK OFFICE
CERTIFICATE OF CORRECTION

| | | |
|---|---|---|
| PATENT NO. | : 9,007,927 B2 | Page 1 of 2 |
| APPLICATION NO. | : 12/751675 | |
| DATED | : April 14, 2015 | |
| INVENTOR(S) | : Yih-Hao Lin et al. | |

It is certified that error appears in the above-identified patent and that said Letters Patent is hereby corrected as shown below:

In the Claims

On Col. 23, line 44, claim 24:
Delete "the wireless communication protocol" and
Insert -- the given wireless communication protocol --

On Col. 23, lines 50-51, claim 24:
Delete "the earlier slot for registration" and
Insert -- the earlier portion for registration --

On Col. 23, line 54, claim 36:
Delete "the given multicast messages" and
Insert -- the multicast messages --

On Col. 25, lines 33-34, claim 41:
Delete "the wireless communication protocol" and
Insert -- the given wireless communication protocol --

On Col. 26, lines 46-47, claim 51:
Delete "the wireless communication protocol" and
Insert -- the given wireless communication protocol --

Signed and Sealed this
Fifteenth Day of September, 2015

Michelle K. Lee
*Director of the United States Patent and Trademark Office*

CERTIFICATE OF CORRECTION (continued)
U.S. Pat. No. 9,007,927 B2

On Col. 26, line 52, claim 51:

Delete "the earlier slot" and

Insert -- the earlier portion --

On Col. 27, lines 19-20, claim 53:

Delete "the wireless communication protocol" and

Insert -- the given wireless communication protocol --

On Col. 27, line 25, claim 53:

Delete "the earlier slot" and

Insert -- the earlier portion --